US012756064B2

(12) United States Patent
Taguchi

(10) Patent No.: US 12,756,064 B2
(45) Date of Patent: Oct. 6, 2026

(54) LAMINATE FOR ELECTROCHEMICAL DEVICE AND ELECTROCHEMICAL DEVICE

(71) Applicant: ZEON CORPORATION, Tokyo (JP)

(72) Inventor: Hiroyuki Taguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 584 days.

(21) Appl. No.: 17/759,535

(22) PCT Filed: Feb. 1, 2021

(86) PCT No.: PCT/JP2021/003603
§ 371 (c)(1),
(2) Date: Jul. 27, 2022

(87) PCT Pub. No.: WO2021/161842
PCT Pub. Date: Aug. 19, 2021

(65) Prior Publication Data

US 2023/0079279 A1 Mar. 16, 2023

(30) Foreign Application Priority Data

Feb. 12, 2020 (JP) ................................ 2020-021791

(51) Int. Cl.
*H01M 50/446* (2021.01)
*C09J 7/35* (2018.01)
(Continued)

(52) U.S. Cl.
CPC ........... *H01M 50/446* (2021.01); *C09J 11/04* (2013.01); *H01G 11/52* (2013.01); *H01M 4/62* (2013.01);
(Continued)

(58) Field of Classification Search
CPC .. H01M 50/451; H01M 50/446; H01M 50/42; H01M 50/431; H01M 50/414;
(Continued)

(56) References Cited

U.S. PATENT DOCUMENTS 10,818,900 B2 * 10/2020 Arnold .............. H01M 10/0525
11,502,373 B2 11/2022 Kim et al.
(Continued)

FOREIGN PATENT DOCUMENTS

CN 105958000 A * 9/2016 ........ H01M 10/0525
CN 108219720 A * 6/2018 .............. C09J 11/06
(Continued)

OTHER PUBLICATIONS

Translation of KR-20160118979-A.*
(Continued)

*Primary Examiner* — Kourtney R S Carlson
(74) *Attorney, Agent, or Firm* — KENJA IP LAW PC

(57) ABSTRACT

Provided is a laminate for an electrochemical device that can advantageously be used as a device member having excellent low-temperature adhesiveness and blocking resistance. The laminate includes a functional layer containing heat-resistant fine particles and adhesive particles and a substrate. The adhesive particles contain an adhesive polymer that includes an aromatic vinyl monomer unit and a wax that has a melting point of lower than 95° C. In plan view of the laminate from a side corresponding to the functional layer, the functional layer includes an adhesion region formed of the adhesive particles and a heat-resistant region formed of the heat-resistant fine particles. The volume-average particle diameter of the adhesive particles is larger than the average stacking direction height of the heat-resistant region.

14 Claims, 2 Drawing Sheets

(51) Int. Cl.

| | |
|---|---|
| ***C09J 11/04*** | (2006.01) |
| ***H01G 11/52*** | (2013.01) |
| ***H01M 4/02*** | (2006.01) |
| ***H01M 4/62*** | (2006.01) |
| ***H01M 50/42*** | (2021.01) |
| ***H01M 50/431*** | (2021.01) |
| ***H01M 50/449*** | (2021.01) |

(52) U.S. Cl.

CPC ......... *H01M 50/42* (2021.01); *H01M 50/431* (2021.01); *H01M 50/449* (2021.01); *C09J 7/35* (2018.01); *C09J 2203/33* (2013.01); *C09J 2301/304* (2020.08); *C09J 2301/408* (2020.08); *C09J 2301/414* (2020.08); *C09J 2425/00* (2013.01); *C09J 2491/00* (2013.01); *H01M 2004/021* (2013.01)

(58) Field of Classification Search

CPC ............. H01M 50/429; H01M 50/443; H01M 50/434; H01M 50/449; H01M 50/461; H01M 50/409; H01M 4/62; H01M 4/131; H01M 4/137; H01M 2004/021; H01M 10/0525; C09J 7/35; C09J 11/04; C09J 2203/33; C09J 2301/304; C09J 2301/408; C09J 2301/414; C09J 2425/00; C09J 2491/00; H01G 11/38; H01G 11/28; H01G 11/52; H01G 11/26; Y02E 60/10

See application file for complete search history.

(56) References Cited

U.S. PATENT DOCUMENTS

| | | | | |
|---|---|---|---|---|
| 2005/0221165 A1* | 10/2005 | Hennige | ............. | H01M 50/451 429/251 |
| 2014/0057057 A1* | 2/2014 | Terai | ................... | H01M 50/426 427/535 |
| 2015/0045509 A1* | 2/2015 | Tomatsu | ................ | C09J 123/26 525/240 |
| 2016/0104893 A1* | 4/2016 | Itou | ......................... | H01M 4/13 524/400 |
| 2017/0012264 A1* | 1/2017 | Carlson | .................. | H01G 11/20 |
| 2019/0280274 A1* | 9/2019 | Kim | ...................... | H01M 50/44 |
| 2020/0048426 A1* | 2/2020 | Kossoy | .................. | C01G 41/00 |
| 2020/0052270 A1 | 2/2020 | Sugimoto | | |
| 2020/0067047 A1 | 2/2020 | Sugimoto | | |

FOREIGN PATENT DOCUMENTS

| | | | | | |
|---|---|---|---|---|---|
| CN | 110233223 | A | | 9/2019 | |
| JP | 2008123996 | A | * | 5/2008 | ............... H01G 9/02 |
| JP | 2010170770 | A | * | 8/2010 | |
| KR | 1020140082378 | A | | 7/2014 | |
| KR | 1020140096522 | A | | 8/2014 | |
| KR | 101491607 | B1 | * | 2/2015 | |
| KR | 1020160041496 | A | | 4/2016 | |
| KR | 20160118979 | A | * | 10/2016 | |
| KR | 1020160118979 | A | | 10/2016 | |
| WO | 2018034093 | A1 | | 2/2018 | |
| WO | 2018034094 | A1 | | 2/2018 | |
| WO | 2019089492 | A1 | | 5/2019 | |
| WO | WO-2019164130 | A1 | * | 8/2019 | ........ H01M 10/0431 |

OTHER PUBLICATIONS

Translation of JP-2010170770-A.*
Translation of WO-2019164130-A1 and original copy.*
Translation of JP-2008123996-A and original copy.*
Translation of KR-101491607-B1 and original copy.*
Translation of CN-105958000-A and original copy.*
English Machine Translation of CN 108219720A (Year: 2018).*
Aug. 11, 2022, International Preliminary Report on Patentability issued in the International Patent Application No. PCT/JP2021/003603.
Feb. 3, 2025, the Extended European Search Report issued by the European Patent Office in the corresponding European Patent Application No. 21754521.9.

* cited by examiner

LAMINATE FOR ELECTROCHEMICAL DEVICE AND ELECTROCHEMICAL DEVICE

TECHNICAL FIELD

The present disclosure relates to a laminate for an electrochemical device and an electrochemical device.

BACKGROUND

Electrochemical devices such as lithium ion secondary batteries, electric double-layer capacitors, and lithium ion capacitors have characteristics such as compact size, light weight, high energy-density, and the ability to be repeatedly charged and discharged, and are used in a wide variety of applications. An electrochemical device normally includes device members such as a plurality of electrodes and a separator that isolates these electrodes from one another and prevents internal short-circuiting.

A laminate for an electrochemical device that has a layer (functional layer) for causing the display of a desired function such as heat resistance or adhesiveness stacked on a substrate may conventionally be used as a device member such as an electrode or a separator. Moreover, the formation of a functional layer included in such a laminate may conventionally be performed using a combination of particles that can display heat resistance (heat-resistant fine particles) and particles that can display adhesiveness (adhesive particles) (for example, refer to Patent Literature (PTL) 1 and 2).

CITATION LIST

Patent Literature

PTL 1: WO2018/034093A1

PTL 2: WO2018/034094A1

SUMMARY

Technical Problem

In production of an electrochemical device, a plurality of device members such as an electrode and a separator may be stacked on one another, may optionally be wound up, and may subsequently be heat pressed to produce a cell. However, when a device member formed of a conventional laminate such as described above has been used, there has been a problem that shortening the heat pressing time with the aim of improving cell production efficiency, for example, makes it difficult for sufficient adhesiveness to be displayed by a functional layer in a laminate that is positioned in a central part of a cell where sufficient transmission of heat is difficult. One technique that may be considered in response to this problem is lowering the glass-transition temperature of adhesive particles in the functional layer so as to ensure low-temperature adhesiveness. However, studies conducted by the inventor and others have revealed that in the case of a device member in which low-temperature adhesiveness is ensured by this technique, there is a problem that device members may become stuck together via a functional layer (i.e., blocking may occur) when the device member is stored or transported in a wound up state, for example.

In other words, there is room for further improvement of a conventional laminate such as described above in terms of displaying a good balance of low-temperature adhesiveness and blocking resistance when used as a device member.

Accordingly, an object of the present disclosure is to provide a laminate for an electrochemical device that can advantageously be used as a device member having excellent low-temperature adhesiveness and blocking resistance, and also to provide an electrochemical device that includes this laminate for an electrochemical device as a device member.

Solution to Problem

The inventor made extensive studies to achieve the foregoing object. The inventor discovered that by producing a laminate that includes a functional layer on a substrate using adhesive particles that contain a specific adhesive polymer and a wax having a melting point of lower than a specific value while also providing the functional layer on the substrate with a specific form, the produced laminate can be used as a device member having both excellent low-temperature adhesiveness and excellent blocking resistance. In this manner, the inventor completed the present disclosure.

Specifically, the present disclosure aims to advantageously solve the problem set forth above, and a presently disclosed laminate for an electrochemical device comprises: a functional layer containing heat-resistant fine particles and adhesive particles; and a substrate, wherein the adhesive particles contain an adhesive polymer that includes an aromatic vinyl monomer unit and a wax that has a melting point of lower than 95° C., the functional layer includes an adhesion region formed of the adhesive particles and a heat-resistant region formed of the heat-resistant fine particles in plan view from a side corresponding to the functional layer, and the adhesive particles have a volume-average particle diameter that is larger than an average stacking direction height of the heat-resistant region. The laminate set forth above can advantageously be used as a device member having excellent low-temperature adhesiveness and blocking resistance.

Note that when a polymer is said to "include a monomer unit" in the present disclosure, this means that a polymer obtained using that monomer includes a repeating unit derived from the monomer.

Also note that the "melting point" of a wax referred to in the present disclosure can be determined by using a differential scanning calorimeter (DSC) to perform measurement under conditions of heating at 100° C./min and taking a maximum value of the obtained DSC curve.

Moreover, the "volume-average particle diameter" of adhesive particles contained in a functional layer that is referred to in the present disclosure can be measured using a method described in the EXAMPLES section.

Furthermore, the "average stacking direction height" of a heat-resistant region that is referred to in the present disclosure can be measured using a method described in the EXAMPLES section.

In the presently disclosed laminate for an electrochemical device, the volume-average particle diameter of the adhesive particles is preferably not less than 1.0 μm and not more than 10.0 μm. When the volume-average particle diameter of the adhesive particles is within the range set forth above, heat resistance of a device member formed of the laminate can be increased while also further improving low-temperature adhesiveness and blocking resistance of the device member.

In the presently disclosed laminate for an electrochemical device, a ratio of the volume-average particle diameter of the adhesive particles relative to the average stacking direction height of the heat-resistant region is preferably not less than 1.1 and not more than 10.0. When the ratio (volume-average particle diameter of adhesive particles/average stacking direction height of heat-resistant region) of the volume-average particle diameter of the adhesive particles relative to the average stacking direction height of the heat-resistant region is within the range set forth above, heat resistance of a device member formed of the laminate can be increased while also further improving low-temperature adhesiveness and blocking resistance of the device member.

In the presently disclosed laminate for an electrochemical device, the adhesive particles preferably have a glass-transition temperature of not lower than 10° C. and not higher than 90° C. When the glass-transition temperature of a polymer contained in the adhesive particles is within the range set forth above, low-temperature adhesiveness and blocking resistance of a device member formed of the laminate can be further improved.

Note that the "glass-transition temperature" of adhesive particles or the like referred to in the present disclosure can be measured using a method described in the EXAMPLES section.

In the presently disclosed laminate for an electrochemical device, the adhesive polymer preferably further includes a cross-linkable monomer unit. By using an adhesive polymer that includes a cross-linkable monomer unit in addition to an aromatic vinyl monomer unit, it is possible to further improve low-temperature adhesiveness of a device member formed of the laminate.

In the presently disclosed laminate for an electrochemical device, the heat-resistant fine particles are preferably inorganic fine particles. By using inorganic fine particles as the heat-resistant fine particles, it is possible to improve heat resistance of a device member formed of the laminate.

In the presently disclosed laminate for an electrochemical device, the wax is preferably an ester wax. By using an ester wax as the wax, it is possible to further improve low-temperature adhesiveness of a device member formed of the laminate.

In the presently disclosed laminate for an electrochemical device, the melting point of the wax is preferably 40° C. or higher. By using a wax having a melting point of 40° C. or higher, it is possible to further improve blocking resistance of a device member formed of the laminate.

In the presently disclosed laminate for an electrochemical device, a volume ratio of content of the heat-resistant fine particles relative to content of the adhesive particles in the functional layer is preferably not less than 55/45 and not more than 95/5. When the volume ratio (heat-resistant fine particles/adhesive particles) of the content of the heat-resistant fine particles relative to the content of the adhesive particles in the functional layer is within the range set forth above, heat resistance of a device member formed of the laminate can be increased while also further improving low-temperature adhesiveness of the device member.

Moreover, the present disclosure aims to advantageously solve the problem set forth above, and a presently disclosed electrochemical device comprises an electrode and a separator, wherein at least one of the electrode and the separator is formed using any one of the laminates for an electrochemical device set forth above. An electrochemical device that includes any one of the laminates set forth above as a device member has excellent device characteristics such as rate characteristics and cycle characteristics.

Advantageous Effect

According to the present disclosure, it is possible to provide a laminate for an electrochemical device that can advantageously be used as a device member having excellent low-temperature adhesiveness and blocking resistance, and also to provide an electrochemical device including this laminate for an electrochemical device as a device member.

DETAILED DESCRIPTION

The following provides a detailed description of embodiments of the present disclosure.

The presently disclosed laminate for an electrochemical device can be used as a device member such as a separator or an electrode (positive electrode or negative electrode). Moreover, the presently disclosed electrochemical device includes the presently disclosed laminate for an electrochemical device as a device member.

(Laminate for Electrochemical Device)

The presently disclosed laminate includes a substrate and a functional layer formed on the substrate. The functional layer on the substrate includes at least an adhesion region formed of adhesive particles and a heat-resistant region formed of heat-resistant fine particles in plan view. A feature thereof is that the volume-average particle diameter of the adhesive particles forming the adhesion region is larger than the average stacking direction height of the heat-resistant region.

The presently disclosed laminate having the configuration set forth above can adhere well to an adherend via the functional layer, which is presumed to be due to there being a large number of sites where the adhesive particles of the adhesion region protrude beyond the heat-resistant region in the functional layer.

In addition, low-temperature adhesiveness of a device member formed of the laminate improves, which is presumed to be due to an adhesive polymer and/or wax originating from adhesive particles that have been melted by heat pressing infiltrating into a matrix of the heat-resistant fine particles forming the heat-resistant region and thereby serving as an anchor (obtaining an anchor effect). On the other hand, it is presumed that due to the heat-resistant region suppressing excessive spreading in a direction parallel to the substrate surface of an adhesive polymer and/or wax originating from adhesive particles that have been melted by heat pressing and thereby ensuring a path for the passage of charge carriers such as lithium ions, there is improvement of device characteristics such as rate characteristics and cycle characteristics.

Figure 1:
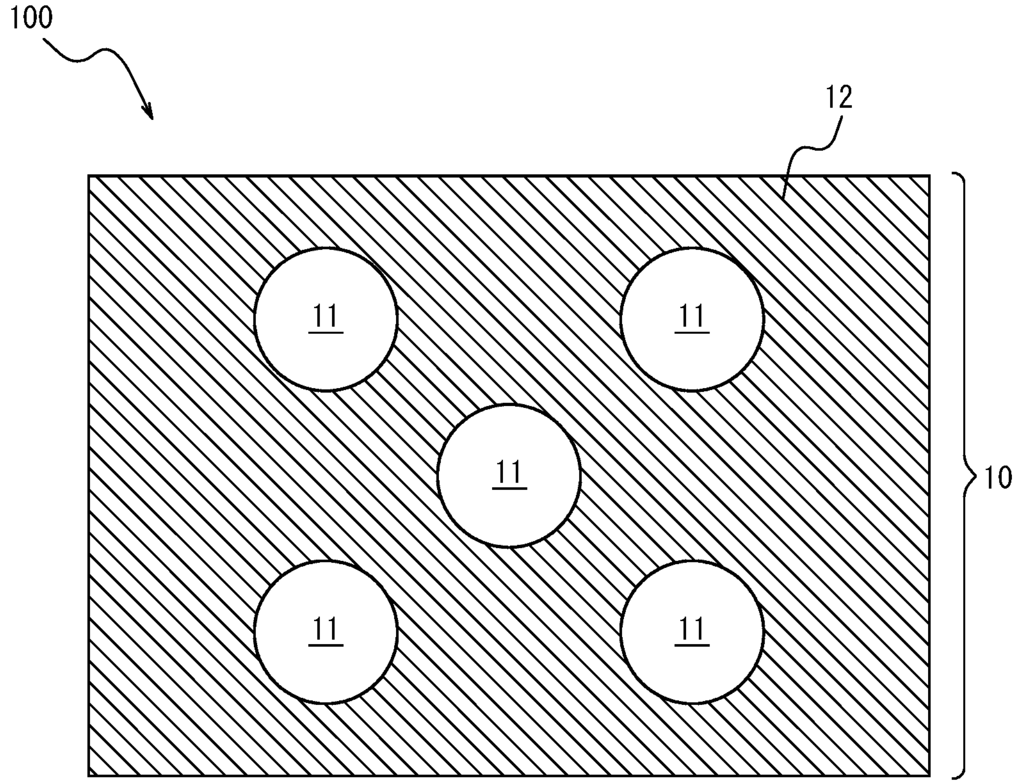
FIG. 1 is a plan view schematically illustrating one example of a laminate for an electrochemical device according to the present disclosure in plan view from a side corresponding to a functional layer.
Figure 2:
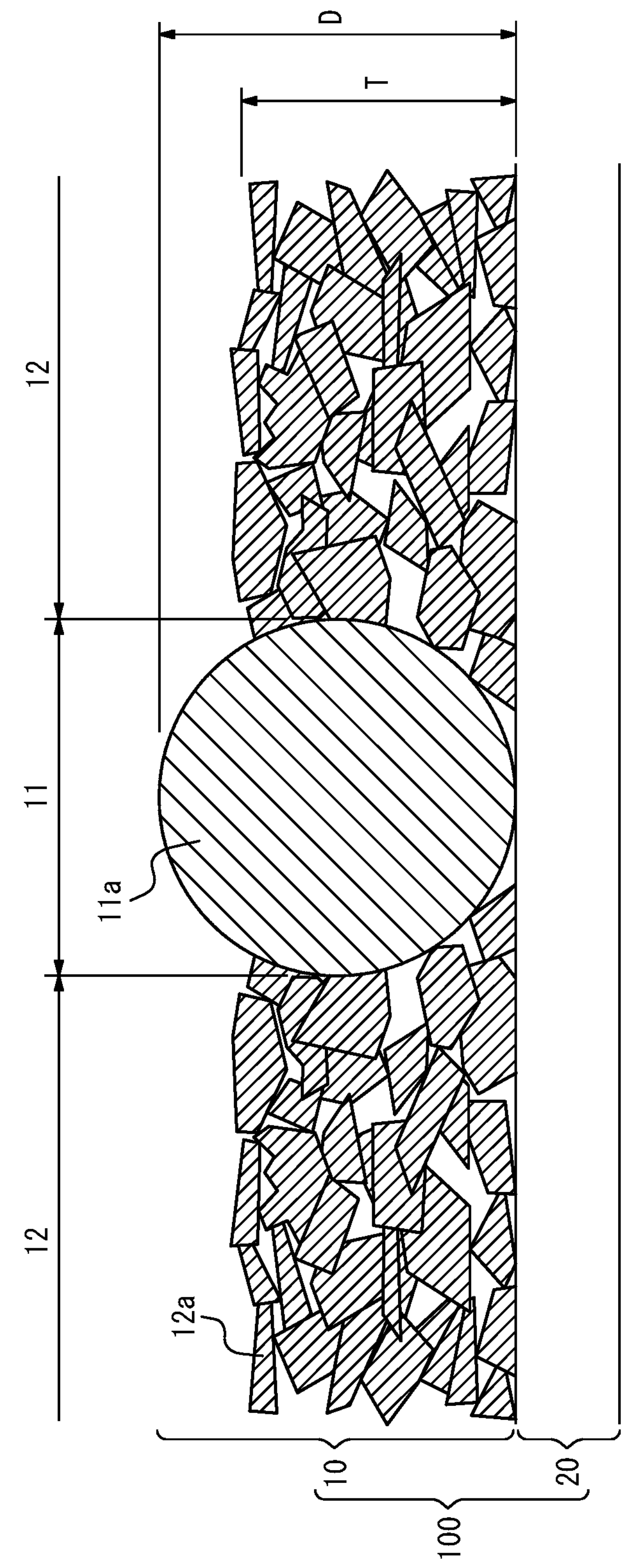
FIG. 2 is a cross-sectional view schematically illustrating one example of a stacking direction cross-section of a laminate for an electrochemical device according to the present disclosure.

One example of the presently disclosed laminate is further described using FIG. 1 and FIG. 2.

FIG. 1 is a plan view schematically illustrating one example of when a laminate 100 for an electrochemical device according to the present disclosure is viewed in plan view from a side corresponding to a functional layer. In FIG. 1, a heat-resistant region 12 and a plurality of adhesion regions 11 surrounded by the heat-resistant region 12 are present at the surface of a functional layer 10 included in the laminate 100 for an electrochemical device.

FIG. 2 is a cross-sectional view schematically illustrating one example of a stacking direction cross-section of the laminate 100 for an electrochemical device according to the present disclosure. In FIG. 2, the laminate 100 for an electrochemical device has the functional layer 10 stacked on a substrate 20, and the functional layer 10 includes an adhesion region 11 and a heat-resistant region 12. The adhesion region 11 is formed of an adhesive particle 11*a*, and the heat-resistant region 12 is formed of a plurality of heat-resistant fine particles 12*a* that overlap with one another in the stacking direction (thickness direction). In FIG. 2, the particle diameter (stacking direction height from the substrate surface) D of the adhesive particle is larger than the stacking direction height T of the heat-resistant region. It is thought that as a result of the volume-average particle diameter of adhesive particles being larger than the average stacking direction height of the heat-resistant region in the presently disclosed laminate, there are a large number of sites where an adhesive particle protrudes as illustrated in FIG. 2.

It should be noted that the presently disclosed laminate is not limited to the example illustrated in FIG. 1 and FIG. 2. For example, the presently disclosed laminate may include functional layers at both sides of the substrate. In a case in which the presently disclosed laminate includes functional layers at both sides of the substrate, at least one of these functional layers is a functional layer satisfying the prescribed properties. Moreover, although an adhesion region in the functional layer of the presently disclosed laminate may be formed of one adhesive particle as illustrated in FIG. 2, alternatively, a plurality of adhesive particles may assemble and form an adhesion region. Furthermore, although an adhesion region in the functional layer of the presently disclosed laminate may be formed of only an adhesive particle as illustrated in FIG. 2, alternatively, an adhesion region may be formed of an adhesive particle and another component such as a subsequently described binder. Also, although a heat-resistant region in the functional layer of the presently disclosed laminate may be formed of only heat-resistant fine particles as illustrated in FIG. 2, alternatively, a heat-resistant region may be formed of heat-resistant fine particles and another component such as a subsequently described binder.

<Volume-Average Particle Diameter of Adhesive Particles>

The volume-average particle diameter of the adhesive particles is not specifically limited so long as it is larger than the average stacking direction height of the heat-resistant region, but is preferably 1.0 μm or more, more preferably 2.5 μm or more, even more preferably 5.0 μm or more, and particularly preferably 6.0 μm or more, and is preferably 10.0 μm or less, more preferably 9.0 μm or less, and even more preferably 8.0 μm or less.

When the volume-average particle diameter of the adhesive particles is 1.0 μm or more, low-temperature adhesiveness of a device member formed of the laminate can be further improved, which is presumed to be due to the adhesive particles of the adhesion region further protruding beyond the heat-resistant region. A larger volume-average particle diameter for the adhesive particles can also improve heat resistance of a device member formed of the laminate, which is presumed to be due to the heat-resistant fine particles in the heat-resistant region adjacent to the adhesion region being able to assemble more densely. Moreover, electrolyte solution injectability of an electrochemical device is presumed to be better due to a gap between the heat-resistant region and an adherend being ensured when a device member including the functional layer is adhered to an adherend.

On the other hand, when the volume-average particle diameter of the adhesive particles is 10.0 μm or less, low-temperature adhesiveness of a device member can be further improved, which is presumed to be due to the number of adhesive particles (number of particles) per unit volume of the functional layer increasing and thereby increasing the number of adhesion points when a device member including the functional layer is adhered to an adherend. Moreover, detachment of the adhesive particles can be inhibited, and a functional layer having adhesion regions formed of adhesive particles present all over the functional layer can be formed on the substrate.

Note that the volume-average particle diameter of the adhesive particles can be adjusted by altering the production conditions of the adhesive particles, for example.

<Average Stacking Direction Height of Heat-Resistant Region>

The average stacking direction height of the heat-resistant region is not specifically limited so long as it is smaller than the volume-average particle diameter of the adhesive particles, but is preferably 0.5 μm or more, more preferably 0.8 μm or more, and even more preferably 1.0 μm or more, and is preferably less than 5.0 μm, more preferably less than 4.0 μm, even more preferably less than 2.5 μm, and particularly preferably 2.0 μm or less. Heat resistance of a device member including the functional layer can be sufficiently ensured when the average stacking direction height of the heat-resistant region is 0.5 μm or more, whereas ion diffusivity of the functional layer can be ensured and rate characteristics and cycle characteristics of an electrochemical device can be improved when the average stacking direction height of the heat-resistant region is less than 5.0 μm.

Note that the average stacking direction height of the heat-resistant region can be adjusted by altering the formation conditions of the functional layer (proportional content of heat-resistant fine particles in a composition for a functional layer used to form the functional layer and thickness of a coating film obtained by supplying the composition for a functional layer onto the substrate), for example.

<Volume-Average Particle Diameter of Adhesive Particles/Average Stacking Direction Height of Heat-Resistant Region>

A ratio (volume-average particle diameter of adhesive particles/average stacking direction height of heat-resistant region) of the volume-average particle diameter of the adhesive particles relative to the average stacking direction height of the heat-resistant region is preferably 1.1 or more, more preferably 1.2 or more, and even more preferably 1.6 or more, and is preferably 10.0 or less, more preferably 5.0 or less, even more preferably 4.5 or less, and particularly preferably 3.5 or less. When the value of this ratio is 1.1 or more, low-temperature adhesiveness of a device member formed of the laminate can be further improved, which is presumed to be due to the adhesive particles of the adhesion region sufficiently protruding beyond the heat-resistant region. On the other hand, when the value of this ratio is 10.0 or less, low-temperature adhesiveness of a device member can be further improved, which is presumed to be due to the number of adhesive particles (number of particles) per unit volume of the functional layer increasing and thereby increasing the number of adhesion points when a device member including the functional layer is adhered to an adherend.

<Functional Layer>

The functional layer included in the presently disclosed laminate having the structure set forth above contains heat-resistant fine particles and adhesive particles that contain an adhesive polymer and a wax. Note that the functional layer may contain components (other components) besides the heat-resistant fine particles and the adhesive particles (adhesive polymer and wax).

<<Heat-Resistant Fine Particles>>

The heat-resistant fine particles contained in the functional layer are not specifically limited and may be particles formed of an inorganic material (i.e., inorganic fine particles) or particles formed of an organic material (i.e., organic fine particles) that are electrochemically stable and are stably present in the environment of use of an electrochemical device.

Note that just inorganic fine particles or just organic fine particles may be used individually as the heat-resistant fine particles, or inorganic fine particles and organic fine particles may be used in combination as the heat-resistant fine particles.

[Inorganic Fine Particles]

The inorganic fine particles may be particles of an inorganic oxide such as aluminum oxide (alumina, $Al_2O_3$), hydrous aluminum oxide (boehmite, AlOOH), gibbsite ($Al(OH)_3$), silicon oxide, magnesium oxide (magnesia), magnesium hydroxide, calcium oxide, titanium oxide (titania), barium titanate ($BaTiO_3$), ZrO, or alumina-silica complex oxide; particles of a nitride such as aluminum nitride or boron nitride; particles of covalently bonded crystals such as silicon or diamond; particles of sparingly soluble ionic crystals such as barium sulfate, calcium fluoride, or barium fluoride; fine particles of clay such as talc or montmorillonite; or the like. These particles may be subjected to element substitution, surface treatment, solid solution treatment, or the like as necessary. Note that one type of inorganic fine particles may be used individually, or two or more types of inorganic fine particles may be used in combination.

[Organic Fine Particles]

The organic fine particles are fine particles formed of a polymer that does not display adhesiveness and that differs from the adhesive polymer contained in the aforementioned adhesive particles.

Examples of the organic fine particles include particles of various cross-linked polymers such as cross-linked polymethyl methacrylate, cross-linked polystyrene, cross-linked polydivinylbenzene, cross-linked styrene-divinylbenzene copolymer, polystyrene, polyimide, polyamide, polyamide-imide, melamine resin, phenolic resin, and benzoguanamine-formaldehyde condensate, particles of heat-resistant polymers such as polysulfone, polyacrylonitrile, polyaramid, polyacetal, and thermoplastic polyimide, and modified products and derivatives of any of the preceding examples. Note that one type of organic fine particles may be used individually, or two or more types of organic fine particles may be used in combination.

Note that the organic fine particles are formed of a polymer that does not display adhesiveness as previously described. Specifically, the glass-transition temperature of the polymer forming the organic fine particles is preferably 90° C. or higher, and more preferably 150° C. or higher.

Of the examples of heat-resistant fine particles given above, particles formed of alumina (alumina particles), particles formed of boehmite (boehmite particles), particles formed of titania (titania particles), particles formed of barium sulfate (barium sulfate particles), and organic fine particles having a glass-transition temperature of 150° C. or higher are preferable from a viewpoint of further improving heat resistance of a device member, with alumina particles, boehmite particles, titania particles, and barium sulfate particles being more preferable.

[Properties of Heat-Resistant Fine Particles]

The volume-average particle diameter of the heat-resistant fine particles is preferably 0.1 μm or more, more preferably 0.2 μm or more, and even more preferably 0.3 μm or more, and is preferably 1.0 μm or less, more preferably 0.9 μm or less, and even more preferably 0.8 μm or less. When the volume-average particle diameter of the heat-resistant fine particles is 0.1 μm or more, the heat-resistant fine particles are densely packed in the functional layer. This can inhibit reduction of ion conductivity of the functional layer and can cause an electrochemical device to display excellent device characteristics (particularly rate characteristics). On the other hand, when the volume-average particle diameter of the heat-resistant fine particles is 1.0 μm or less, a device member formed of the laminate including the functional layer can be caused to sufficiently display excellent heat resistance even when the functional layer is thin. Consequently, heat resistance of the device member can be sufficiently ensured while also increasing the capacity of an electrochemical device.

<<Adhesive Particles>>

The adhesive particles are formed through at least the adhesive polymer and the wax exhibiting a particulate form together. Although the adhesive polymer and the wax may be present separately in the adhesive particles, it is preferable that at least some of the adhesive polymer and the wax are in a mixed state. Note that the adhesive particles may optionally contain components (optional components) other than the adhesive polymer and the wax.

[Adhesive Polymer]

The adhesive polymer contained in the adhesive particles includes at least an aromatic vinyl monomer unit. The adhesive polymer may also include monomer units (other monomer units) besides the aromatic vinyl monomer unit.

—Aromatic Vinyl Monomer Unit—

The inclusion of an aromatic vinyl monomer unit in the adhesive polymer improves elasticity of the adhesive particles and makes it possible to increase strength of the functional layer.

Examples of aromatic vinyl monomers that can form an aromatic vinyl monomer unit include, but are not specifically limited to, styrene, α-methylstyrene, styrene sulfonic acid, butoxystyrene, and vinylnaphthalene. One of these aromatic vinyl monomers may be used individually, or two or more of these aromatic vinyl monomers may be used in combination. Of these aromatic vinyl monomers, styrene is preferable.

The proportional content of aromatic vinyl monomer units in the adhesive polymer when all monomer units in the adhesive polymer is taken to be 100 mass % is preferably 30 mass % or more, and more preferably 60 mass % or more, and is preferably 90 mass % or less, and more preferably 85 mass % or less. When the proportional content of aromatic vinyl monomer units is 30 mass % or more, elasticity of the adhesive particles can be sufficiently improved, and strength of the functional layer can be even further increased. Consequently, low-temperature adhesiveness of a device member formed of the laminate can be further improved. On the other hand, when the proportional content of aromatic vinyl monomer units is 90 mass % or less, flexibility of the adhesive particles can be increased, and low-temperature adhesiveness of a device member formed of the laminate can be further improved. Moreover, when the proportional content of aromatic vinyl monomer units is within any of the ranges set forth above, low-temperature adhesiveness of a device member formed of the laminate can be further improved while also causing an electrochemical device to display excellent device characteristics (rate characteristics and cycle characteristics) using this device member, which is presumed to be due to a good balance of elasticity and flexibility of the adhesive particles being ensured as described above.

Note that the "proportional content" of each "monomer unit" included in a polymer referred to in the present disclosure can be measured by a nuclear magnetic resonance (NMR) method such as $^{1}$H-NMR.

—Other Monomer Units—

Although no specific limitations are placed on other monomer units, a cross-linkable monomer unit and a (meth) acrylic acid ester monomer unit are preferable.

Note that in the present disclosure, "(meth)acryl" is used to indicate "acryl" and/or "methacryl".

A cross-linkable monomer that can form a cross-linkable monomer unit is a monomer that can form a cross-linked structure during or after polymerization through heating or irradiation with energy rays. The inclusion of a cross-linkable monomer unit in the adhesive polymer makes it possible to improve elasticity of the adhesive particles and to thereby further improve low-temperature adhesiveness of a device member formed of the laminate.

Examples of monomers that can form a cross-linkable monomer unit include polyfunctional monomers including at least two groups displaying polymerization reactivity. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. One of these polyfunctional monomers may be used individually, or two or more of these polyfunctional monomers may be used in combination. Of these polyfunctional monomers, ethylene glycol dimethacrylate is preferable.

The proportional content of cross-linkable monomer units in the adhesive polymer when the amount of all monomer units in the adhesive polymer is taken to be 100 mass % is preferably 0.02 mass % or more, and is preferably 2 mass % or less, more preferably 1.5 mass % or less, and even more preferably 1 mass % or less. When the proportional content of cross-linkable monomer units is within any of the ranges set forth above, the adhesive polymer contained in the adhesive particles can be sufficiently inhibited from eluting into electrolyte solution. Moreover, elasticity of the adhesive particles can be improved, and, as a result, low-temperature adhesiveness of a device member formed of the laminate can be further improved.

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate.

One of these (meth)acrylic acid ester monomers may be used individually, or two or more of these (meth)acrylic acid ester monomers may be used in combination. Of these (meth)acrylic acid ester monomers, n-butyl acrylate, 2-ethylhexyl acrylate, and methyl methacrylate are preferable, and n-butyl acrylate and 2-ethylhexyl acrylate are more preferable.

The proportional content of (meth)acrylic acid ester monomer units in the adhesive polymer when all monomer units in the adhesive polymer are taken to be 100 mass % is preferably 5 mass % or more, and more preferably 10 mass % or more, and is preferably 65 mass % or less, more preferably 60 mass % or less, and even more preferably 35 mass % or less. When the proportional content of (meth) acrylic acid ester monomer units is 5 mass % or more, excessive lowering of the glass-transition temperature of the adhesive particles can be inhibited, and blocking resistance of a device member formed of the laminate can be further improved. On the other hand, when the proportional content of (meth)acrylic acid ester monomers units is 65 mass % or less, low-temperature adhesiveness of a device member formed of the laminate can be further improved.

No specific limitations are placed on other monomer units besides the cross-linkable monomer unit and the (meth) acrylic acid ester monomer unit described above, and examples thereof include monomer units that are subsequently described in the "Binder" section (excluding those corresponding to an aromatic vinyl monomer unit, cross-linkable monomer unit, or (meth)acrylic acid ester monomer unit).

The proportional content of monomer units other than that the aromatic vinyl monomer unit, cross-linkable monomer unit, and (meth)acrylic acid ester monomer unit described above in the adhesive polymer when all monomer units in the adhesive polymer are taken to be 100 mass % is preferably not less than 0 mass % and not more than 10 mass %, more preferably not less than 0 mass % and not more than 7 mass %, and even more preferably not less than 0 mass % and not more than 5 mass % from a viewpoint of ensuring stability of a composition for a functional layer used to form the functional layer.

[Wax]

The wax having a melting point of lower than 95° C. that is contained in the adhesive particles is a substance that forms the adhesive particles in conjunction with the adhesive polymer described above. By using adhesive particles that contain a wax in formation of the functional layer of the laminate, it is possible to ensure blocking resistance of a device member formed of the laminate while also improving low-temperature adhesiveness of the device member. Although the reason for this is not clear, it is presumed to be as follows.

As a result of an anchoring effect such as previously described being obtained when a device member formed of the laminate is subjected to heat pressing, this device member displays excellent low-temperature adhesiveness, whereas the wax has a low tendency to display adhesive capability thereof during storage, transportation, or the like in a normal temperature region. For this reason, formation of the functional layer using adhesive particles that contain a wax having a melting point of lower than 95° C. is thought to enable a balance of excellent low-temperature adhesiveness and blocking resistance in a device member formed of the laminate.

—Melting Point—

The melting point of the wax is required to be lower than 95° C. as described above, is preferably 90° C. or lower, more preferably 70° C. or lower, and even more preferably 60° C. or lower, and is preferably 40° C. or higher, and more preferably 44° C. or higher. In a situation in which the melting point of the wax is 95° C. or higher, low-temperature adhesiveness of a device member formed of the laminate decreases. On the other hand, blocking resistance of a device member formed of the laminate can be further improved when the melting point of the wax is 40° C. or higher.

—Type—

The wax contained in the adhesive particles may be a plant wax, an animal wax, a petroleum wax, a synthetic wax, a modified product of any of these waxes, or the like without any specific limitations so long as it has a melting point of lower than 95° C.

Specific examples of plant waxes that may be used include candelilla wax, carnauba wax, rice bran wax, Japan wax, and jojoba oil.

Specific examples of animal waxes that may be used include beeswax.

Specific examples of petroleum waxes that may be used include paraffin wax, microcrystalline wax, and petrolatum wax.

Synthetic waxes can be categorized as Fischer-Tropsch waxes, polyolefin waxes, ester waxes, and so forth.

Specific examples of polyolefin waxes that may be used include polyethylene wax, polypropylene wax, and polybutylene wax.

Either of a monohydric alcohol fatty acid ester and a polyhydric alcohol fatty acid ester may be used as an ester wax. Specific examples of monohydric alcohol fatty acid esters that may be used include behenyl stearate. Specific examples of polyhydric alcohol fatty acid esters that may be used include pentaerythritol esters such as pentaerythritol tetramyristate, pentaerythritol tetrapalmitate, pentaerythritol tetrastearate, pentaerythritol tetralaurate, and pentaerythritol tetrabehenate; and dipentaerythritol esters such as dipentaerythritol hexamyristate, dipentaerythritol hexapalmitate, and dipentaerythritol hexalaurate.

Note that one wax may be used individually, or two or more waxes may be used in combination. The wax is preferably an ester wax or a paraffin wax from a viewpoint of it being easy to increase the content thereof in the adhesive particles due to excellent compatibility with a monomer composition used to produce the adhesive polymer, and consequently being possible to further improve low-temperature adhesiveness of a device member formed of the laminate, and is more preferably an ester wax.

The content of the wax in the adhesive particles per 100 parts by mass of the adhesive polymer is preferably 1 part by mass or more, more preferably 2 parts by mass or more, even more preferably 6 parts by mass or more, and particularly preferably 10 parts by mass or more, and is preferably 30 parts by mass or less, more preferably 25 parts by mass or less, even more preferably 20 parts by mass or less, further preferably 15 parts by mass or less, and particularly preferably 12 parts by mass or less. When the content of the wax in the adhesive particles is 1 part by mass or more per 100 parts by mass of the adhesive polymer, low-temperature adhesiveness of a device member formed of the laminate can be further improved. On the other hand, when the content of the wax in the adhesive particles is 30 parts by mass or less per 100 parts by mass of the adhesive polymer, bleed-out of the wax can be sufficiently inhibited, and blocking resistance of a device member formed of the laminate can be further increased while also improving rate characteristics and cycle characteristics of an electrochemical device that includes the device member.

The content of the wax in the functional layer per 100 parts by mass of the adhesive polymer is preferably 1 part by mass or more, more preferably 2 parts by mass or more, even more preferably 6 parts by mass or more, and particularly preferably 10 parts by mass or more, and is preferably 30 parts by mass or less, more preferably 25 parts by mass or less, even more preferably 20 parts by mass or less, further preferably 15 parts by mass or less, and particularly preferably 12 parts by mass or less. When the content of the wax in the functional layer is 1 part by mass or more per 100 parts by mass of the adhesive polymer, low-temperature adhesiveness of a device member formed of the laminate can be further improved. On the other hand, when the content of the wax in the functional layer is 30 parts by mass or less per 100 parts by mass of the adhesive polymer, bleed-out of the wax can be sufficiently inhibited, and blocking resistance of a device member formed of the laminate can be further increased while also improving rate characteristics and cycle characteristics of an electrochemical device that includes the device member.

[Optional Components]

The adhesive particles may optionally contain components other than the adhesive polymer and the wax described above to the extent that the desired effects are obtained.

Although no specific limitations are placed on specific examples of optional components, a saturated fatty acid zinc salt may be included as an optional component in a case in which an ester wax is used as the above-described wax, for example. Note that the saturated fatty acid zinc salt is a different component to the above-described wax. The use of an ester wax in conjunction with a saturated fatty acid zinc salt causes rapid hardening of adhesive particles melted by heat pressing through improvement of solidification temperature, and thereby facilitates handling of an adhered product after heat pressing.

The saturated fatty acid zinc salt is preferably a zinc salt of a monobasic linear saturated fatty acid. When the saturated fatty acid zinc salt is a zinc salt of a monobasic linear saturated fatty acid, the expected effect of the saturated fatty acid zinc salt described above can be obtained well. The carbon number of the monobasic linear saturated fatty acid is preferably 14 or more, more preferably 16 or more, and even more preferably 18 or more, and is preferably 24 or less. When the carbon number of the monobasic linear saturated fatty acid is within any of the ranges set forth above, the expected effect of the saturated fatty acid zinc salt described above can be obtained well.

Specific examples of the monobasic linear saturated fatty acid include myristic acid (carbon number: 14), palmitic acid (carbon number: 16), stearic acid (carbon number: 18), arachidic acid (carbon number: 20), behenic acid (carbon number: 22), and lignoceric acid (carbon number: 24).

Note that one saturated fatty acid zinc salt may be used individually, or two or more saturated fatty acid zinc salts may be used in combination.

[Properties of Adhesive Particles]

The adhesive particles preferably have the following properties in addition to the previously described volume-average particle diameter.

—Glass-Transition Temperature—

The glass-transition temperature of the adhesive particles is preferably 10° C. or higher, more preferably 30° C. or higher, and even more preferably 40° C. or higher, and is preferably 90° C. or lower, and more preferably 80° C. or lower. Blocking resistance of a device member formed of the laminate can be further improved when the glass-transition temperature of the adhesive particles is 10° C. or higher, whereas low-temperature adhesiveness of the device member can be further improved when the glass-transition temperature of the adhesive particles is 90° C. or lower.

—Degree of Swelling in Electrolyte Solution—

The degree of swelling in electrolyte solution of the adhesive particles is preferably a factor of 1.0 or more, more preferably a factor of 1.2 or more, and even more preferably a factor of 1.3 or more, and is preferably a factor of 15 or less, more preferably a factor of 10 or less, and even more preferably a factor of 3 or less. When the degree of swelling in electrolyte solution of the adhesive particles is a factor of 1.0 or more, a device member immersed in electrolyte solution can display strong close adherence to an adherend through the functional layer. On the other hand, when the degree of swelling in electrolyte solution of the adhesive particles is a factor of 15 or less, the resistance of the functional layer in electrolyte solution decreases, thereby enabling improvement of rate characteristics and cycle characteristics of an electrochemical device. Moreover, when the degree of swelling in electrolyte solution of the adhesive particles is a factor of 15 or less, electrolyte solution injectability of an electrochemical device can be increased.

Note that the "degree of swelling in electrolyte solution" of adhesive particles referred to in the present disclosure can be measured by a method described in the EXAMPLES section.

[Production of Adhesive Particles]

The production method of the adhesive particles containing the adhesive polymer and the wax described above is not specifically limited and may be a method in which a monomer composition containing the wax and a monomer group of an aromatic vinyl monomer, etc., is suspension polymerized, a method in which the monomer composition is emulsion polymerized and subsequently caused to aggregate, a method in which the monomer composition is polymerized by any method and then the resultant polymerized product is pulverized, or the like. However, a method in which the monomer composition is suspension polymerized is preferable from a viewpoint of enabling low-cost production.

The following describes, as one example, a production method of the adhesive particles by suspension polymerization.

—Production of Monomer Composition—

First, a monomer group of an aromatic vinyl monomer, etc., a wax, and other compounding agents that are added as necessary are mixed so as to produce a monomer composition.

Note that in a case in which the wax (particularly an ester wax) is used in conjunction with a saturated fatty acid zinc salt, it is preferable that the saturated fatty acid zinc salt and the wax are premixed in advance of production of the monomer composition so as to produce a wax composition, and that this wax composition is then used in production of the monomer composition. Such a wax composition can be produced by, for example, heating and melting an ester wax and a saturated fatty acid zinc salt to perform uniform mixing thereof and subsequently performing cooling/solidification and then pulverization and/or granulation thereof.

Examples of other compounding agents that may be used include chain transfer agents, polymerization regulators, polymerization reaction retardants, reactive fluidizers, fillers, flame retardants, antioxidants, and colorants.

—Formation of Droplets—

Next, the monomer composition is dispersed in water, a polymerization initiator is added, and then droplets of the monomer composition are formed. The method by which droplets are formed is not specifically limited, and droplets can be formed by, for example, using a disperser such as an emulsifying/dispersing device to perform shear stirring of an aqueous medium containing the monomer composition.

The polymerization initiator may, for example, be an oil-soluble polymerization initiator such as t-butyl peroxy-2-ethylhexanoate or azobisisobutyronitrile. Note that the polymerization initiator may be added after the monomer composition is dispersed in water or may be added to the monomer composition before the monomer composition is dispersed in water.

From a viewpoint of stabilizing droplets of the monomer composition formed in water, it is preferable that a dispersion stabilizer is added into the water and then droplets of the monomer composition are formed.

The dispersion stabilizer may be sodium dodecylbenzenesulfonate, a metal hydroxide such as magnesium hydroxide, or the like, for example.

—Polymerization—

Once droplets of the monomer composition have been formed, the water containing the formed droplets is heated so as to initiate polymerization and thereby form adhesive particles in the water. The reaction temperature during polymerization is preferably not lower than 50° C. and not higher than 95° C. Moreover, the reaction time of the polymerization is preferably not less than 1 hour and not more than 10 hours, and is preferably 8 hours or less, and more preferably 6 hours or less.

—Washing, Filtration, Dehydration, and Drying—

Once the polymerization has ended, the adhesive particles can then be obtained by performing washing, filtration, and drying of the water containing the adhesive particles by standard methods.

[Content Ratio of Heat-Resistant Fine Particles and Adhesive Particles]

Although no specific limitations are placed on the content ratio of the heat-resistant fine particles and the adhesive particles in the functional layer, the value of a volume ratio (heat-resistant fine particles/adhesive particles) of the content of the heat-resistant fine particles relative to the content of the adhesive particles is preferably 55/45 or more, more preferably 60/40 or more, and even more preferably 65/35 or more, and is preferably 95/5 or less, more preferably 80/20 or less, even more preferably 75/25 or less, and particularly preferably 70/30 or less. Heat resistance of a device member formed of the laminate can be improved when the value of heat-resistant fine particles/adhesive particles (by volume) is 55/45 or more, whereas low-temperature adhesiveness of the device member can be further improved when this value is 95/5 or less.

Moreover, the value of a mass ratio (heat-resistant fine particles/adhesive particles) of the content of the heat-resistant fine particles relative to the content of the adhesive particles is preferably 49/51 or more, more preferably 58/42 or more, and even more preferably 64/36 or more, and is preferably 99/1 or less, more preferably 94/6 or less, and even more preferably 91/9 or less. Heat resistance of a device member formed of the laminate including the functional layer can be improved when the value of heat-resistant fine particles/adhesive particles (by mass) is 49/51 or more, whereas low-temperature adhesiveness of the device member can be further improved when this value is 99/1 or less.

<<Other Components>>

The functional layer included in the presently disclosed laminate can include a binder, a water-soluble polymer, or a dispersant (other than a water-soluble polymer) such as sodium dodecylbenzenesulfonate, for example, as a component other than the heat-resistant fine particles and the adhesive particles described above.

Note that one of such other components may be used individually, or two or more of such other components may be used in combination. Of these other components, a binder and a water-soluble polymer are preferable.

Note that the binder and the water-soluble polymer are formed of different polymers to the adhesive polymer that is contained in the previously described adhesive particles and the polymer that forms the previously described organic fine particles.

[Binder]

The binder is not specifically limited and may, for example, be a known polymer that is water-insoluble and can be dispersed in a dispersion medium such as water, examples of which include a conjugated diene polymer, an acrylic polymer, and polyvinylidene fluoride (PVDF). One binder may be used individually, or two or more binders may be used in combination. Moreover, the binder is preferably a conjugated diene polymer or an acrylic polymer, and is more preferably an acrylic polymer.

Note that when a polymer is referred to as "water-insoluble" in the present disclosure, this means that when 0.5 g of the polymer is dissolved in 100 g of water at a temperature of 25° C., insoluble content is 90 mass % or more.

—Conjugated Diene Polymer—

The term "conjugated diene polymer" refers to a polymer that includes a conjugated diene monomer unit derived from a conjugated diene monomer. Specific examples of conjugated diene polymers include, but are not specifically limited to, copolymers that include an aromatic vinyl monomer unit and an aliphatic conjugated diene monomer unit such as styrene-butadiene copolymer (SBR), butadiene rubber (BR), acrylic rubber (NBR) (copolymer including an acrylonitrile unit and a butadiene unit), and hydrogenated products of any of these examples.

—Acrylic Polymer—

The term "acrylic polymer" refers to a polymer that includes a (meth)acrylic acid ester monomer unit. In addition to a (meth)acrylic acid ester monomer unit, the acrylic polymer preferably includes either or both of a cross-linkable monomer unit and an acid group-containing monomer unit, for example.

Examples of (meth)acrylic acid ester monomers that can form a (meth)acrylic acid ester monomer unit include the same (meth)acrylic acid ester monomers as previously described in the "Adhesive particles" section. One of these (meth)acrylic acid ester monomers may be used individually, or two or more of these (meth)acrylic acid ester monomers may be used in combination. Of these (meth) acrylic acid ester monomers, butyl acrylate is preferable.

The proportional content of (meth)acrylic acid ester monomer units in the binder (acrylic polymer) when all monomer units in the binder are taken to be 100 mass % is preferably more than 65 mass %, more preferably 70 mass % or more, even more preferably 80 mass % or more, and particularly preferably 90 mass % or more, and is preferably 99 mass % or less, more preferably 98 mass % or less, and even more preferably 95 mass % or less.

Examples of cross-linkable monomers that can form a cross-linkable monomer unit include the same cross-linkable monomers as previously described in the "Adhesive particles" section. One of these cross-linkable monomers may be used individually, or two or more of these cross-linkable monomers may be used in combination. Of these cross-linkable monomers, allyl methacrylate and allyl glycidyl ether are preferable.

The proportional content of cross-linkable monomer units in the binder (acrylic polymer) when all monomer units in the binder are taken to be 100 mass % is preferably 0.1 mass % or more, and is preferably 3.0 mass % or less, and more preferably 2.5 mass % or less. Rate characteristics and cycle characteristics of an electrochemical device can be improved when the proportion constituted by cross-linkable monomer units is 0.1 mass % or more, whereas low-temperature adhesiveness of a device member formed of the laminate can be further improved when the proportion constituted by cross-linkable monomer units is 3.0 mass % or less.

Examples of acid group-containing monomers that can form an acid group-containing monomer unit include carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Note that one of these acid group-containing monomers may be used individually, or two or more of these acid group-containing monomers may be used in combination. Of these acid group-containing monomers, carboxy group-containing monomers are preferable, and methacrylic acid is more preferable.

The proportional content of acid group-containing monomer units in the binder (acrylic polymer) when all monomer units in the binder are taken to be 100 mass % is preferably 0.1 mass % or more, and is preferably 3.0 mass % or less, and more preferably 2.5 mass % or less.

Note that an acrylic polymer serving as the binder can include monomer units other than the (meth)acrylic acid ester monomer unit, the cross-linkable monomer unit, and the acid group-containing monomer unit described above. Examples of other monomers that can form other monomer units that can be included in the acrylic polymer include aliphatic conjugated diene monomers such as 1,3-butadiene, 2-methyl-1,3-butadiene, 2,3-dimethyl-1,3-butadiene, and 2-chloro-1,3-butadiene; aromatic vinyl monomers such as previously described in the "Adhesive particles" section; nitrile group-containing monomers such as acrylonitrile and methacrylonitrile; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocycle-containing vinyl compound monomers such as N-vinylpyrrolidone, vinylpyridine, and vinylimidazole. Of these examples, acrylonitrile is preferable as another monomer.

Note that one of these other monomers may be used individually, or two or more of these other monomers may be used in combination in a freely selected ratio. The proportional content of other monomer units in the acrylic polymer may be adjusted as appropriate.

Although the binder can include an aromatic vinyl monomer unit, the proportional content of aromatic vinyl monomer units in the binder (particularly an acrylic polymer) when all monomer units in the binder are taken to be 100 mass % is preferably less than 30 mass %, more preferably 20 mass % or less, even more preferably 10 mass % or less, particularly preferably 5 mass % or less, and most preferably 0 mass % (i.e., an aromatic vinyl monomer unit is not included).

—Properties of Binder—

The structure of the binder in the functional layer is not specifically limited but is preferably a non-particulate form that differs from the previously described adhesive particles. Note that the binder may have a particulate form or a non-particulate form in a composition for a functional layer that is used to form the functional layer.

The glass-transition temperature of the binder is preferably −100° C. or higher, more preferably −90° C. or higher, and even more preferably −80° C. or higher, and is preferably lower than 30° C., more preferably 20° C. or lower, even more preferably 15° C. or lower, and particularly preferably lower than 10° C. Binding capacity and strength of the binder can be increased when the glass-transition temperature of the binder is −100° C. or higher, whereas flexibility of the functional layer containing the binder can be sufficiently ensured when the glass-transition temperature of the binder is lower than 30° C.

—Content of Binder—

The content of the binder in the functional layer is preferably 0.1 parts by mass or more, more preferably 0.2 parts by mass or more, and even more preferably 0.5 parts by mass or more per 100 parts by mass of the heat-resistant fine particles, and is preferably 20 parts by mass or less, more preferably 15 parts by mass or less, and even more preferably 10 parts by mass or less per 100 parts by mass of the heat-resistant fine particles. When the content of the binder in the functional layer is 0.1 parts by mass or more per 100 parts by mass of the heat-resistant fine particles, detachment from the functional layer of heat-resistant fine particles present in the heat-resistant region can be sufficiently inhibited while also further improving low-temperature adhesiveness of a device member including the functional layer. On the other hand, when the content of the binder in the functional layer is 20 parts by mass or less per 100 parts by mass of the heat-resistant fine particles, rate characteristics and cycle characteristics of an electrochemical device that includes a device member formed of the laminate can be improved.

—Production Method of Binder—

The binder can be produced through polymerization of a monomer composition containing the monomers described above, carried out in an aqueous solvent such as water, for example, but is not specifically limited to being produced in this manner. The proportion constituted by each monomer among all monomers in the monomer composition is normally the same as the proportion constituted by each monomer unit in the binder.

A known polymerization method and a known polymerization reaction can be adopted as the polymerization method and polymerization reaction without any specific limitations.

[Water-Soluble Polymer]

The water-soluble polymer can function as a dispersant for causing good dispersion of components such as the heat-resistant fine particles and the adhesive particles in a composition for a functional layer that is used to form the functional layer and/or as a thickener for imparting suitable viscosity to the composition for a functional layer.

By functioning as a dispersant as described above, for example, the water-soluble polymer causes good dispersion of the components in the composition for a functional layer, and thereby enables formation of a functional layer in which the heat-resistant region containing the heat-resistant fine particles and the adhesion region containing the adhesive particles are uniformly distributed. Consequently, it is possible to increase heat resistance of a device member that includes the functional layer and to further improve low-temperature adhesiveness of this device member.

Note that when a polymer is referred to as "water-soluble" in the present disclosure, this means that when 0.5 g of the polymer is dissolved in 100 g of water at a temperature of 25° C., insoluble content is less than 1.0 mass %.

The water-soluble polymer may be carboxymethyl cellulose or a salt thereof, polyacrylic acid, or the like, and is preferably polyacrylic acid from a viewpoint of enabling even better dispersion of components such as the heat-resistant fine particles and the adhesive particles and even further improving heat resistance and low-temperature adhesiveness of a device member.

The content of the water-soluble polymer in the functional layer is preferably 0.1 parts by mass or more, more preferably 0.2 parts by mass or more, and even more preferably 0.3 parts by mass or more per 100 parts by mass of the heat-resistant fine particles, and is preferably 1 part by mass or less, more preferably 0.9 parts by mass or less, and even more preferably 0.8 parts by mass or less per 100 parts by mass of the heat-resistant fine particles. When the content of the water-soluble polymer in the functional layer is 0.1 parts by mass or more per 100 parts by mass of the heat-resistant fine particles, components such as the heat-resistant fine particles and the adhesive particles are better dispersed, and heat resistance and low-temperature adhesiveness of a device member even further improve. On the other hand, when the content of the water-soluble polymer in the functional layer is 1 part by mass or less per 100 parts by mass of the heat-resistant fine particles, reduction of ion conductivity of the functional layer can be inhibited, and rate characteristics and cycle characteristics of an electrochemical device can be sufficiently ensured.

The water-soluble polymer can be produced by a known method without any specific limitations.

<Substrate>

The substrate having the above-described functional layer on at least one side thereof may be selected as appropriate depending on the type of device member for which the presently disclosed laminate is to be used. For example, in a case in which the presently disclosed laminate is to be used as a separator, a separator substrate is used as the substrate. Moreover, in a case in which the presently disclosed laminate is to be used as an electrode, for example, an electrode substrate is used as the substrate.

<<Separator Substrate>>

The separator substrate may be a known separator substrate such as an organic separator substrate without any specific limitations. The organic separator substrate is a porous member that is made from an organic material. The organic separator substrate may, for example, be a microporous membrane or non-woven fabric containing a polyolefin resin such as polyethylene, polypropylene, polybutene, or polyvinyl chloride, an aromatic polyamide resin, or the like.

Of these organic separator substrates, a microporous membrane formed of a polyolefin resin is preferable from a viewpoint of being possible to increase the ratio of electrode active material inside an electrochemical device and thereby increase the volumetric capacity of the electrochemical device.

Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm.

<<Electrode Substrate>>

The electrode substrate (positive electrode substrate or negative electrode substrate) is not specifically limited and may, for example, be an electrode substrate obtained by forming an electrode mixed material layer on a current collector.

The current collector, an electrode active material (positive electrode active material or negative electrode active material) and a binder for an electrode mixed material layer (binder for a positive electrode mixed material layer or binder for a negative electrode mixed material layer) in the electrode mixed material layer, and the method by which the electrode mixed material layer is formed on the current collector may be known examples thereof such as any of those described in JP2013-145763A, for example.

<Production Method of Laminate>

The method by which the presently disclosed laminate is produced is not specifically limited and may be a method in which the functional layer is formed on a release sheet and then the functional layer is transferred onto the substrate, for example. However, from a viewpoint of making transfer unnecessary and increasing production efficiency, it is preferable that the laminate is produced through a step (supply step) of supplying a composition for a functional layer containing at least the heat-resistant fine particles, the adhesive particles, and a dispersion medium onto the substrate and a step (drying step) of drying the composition for a functional layer that has been applied onto the substrate.

<<Composition for Functional Layer>>

As described above, the composition for a functional layer contains at least the heat-resistant fine particles and the adhesive particles in a dispersion medium, and optionally contains other components. Although no specific limitations are placed on the dispersion medium, water can preferably be used as the dispersion medium.

The method by which the composition for a functional layer is produced is also not specifically limited and may be known mixing method or dispersing method.

In a case in which the presently disclosed laminate is produced through a supply step and a drying step such as described above, the functional layer that is included in the laminate is formed of a dried product of the composition for a functional layer. Therefore, components contained in the functional layer are components that were contained in the composition for a functional layer, and the preferred ratio of these components in the composition for a functional layer is the same as the preferred ratio of the components in the functional layer described above.

<<Supply Step>>

In the supply step, the composition for a functional layer described above is supplied onto the substrate so as to form a coating film of the composition for a functional layer on the substrate. The method by which the composition for a functional layer is supplied onto the substrate is not specifically limited and may be by applying the composition for a functional layer onto the surface of the substrate or by immersing the substrate in the composition for a functional layer. Application of the composition for a functional layer onto the surface of the substrate is preferable due to ease of controlling the thickness of the produced functional layer (particularly the average stacking direction height of the heat-resistant region).

Examples of methods by which the composition for a functional layer may be applied onto the surface of the substrate include, but are not specifically limited to, doctor blading, reverse roll coating, direct roll coating, gravure coating, bar coating, extrusion coating, and brush coating.

Note that a coating film of the composition for a functional layer may be formed at just one side of the substrate in the supply step or coating films of the composition for a functional layer may be formed at both sides of the substrate in the supply step.

<<Drying Step>>

In the drying step, the coating film of the composition for a functional layer that has been formed on the substrate in the supply step is dried so as to remove the dispersion medium and form a functional layer.

Drying of the coating film of the composition for a functional layer may be performed by any commonly known method without any specific limitations. Examples of drying methods that can be used include drying by warm, hot, or low-humidity air; drying in a vacuum; and drying by irradiation with infrared light, electron beams, or the like. Although no specific limitations are placed on the drying conditions, the drying temperature is preferably 50° C. to 150° C., and the drying time is preferably 1 minute to 30 minutes.

Note that in production of the presently disclosed laminate, the supply step and the drying step may be performed with respect to one side of the substrate to form a functional layer, and then the supply step and the drying step may be further performed with respect to the other side of the substrate to form a functional layer.

(Electrochemical Device)

The presently disclosed electrochemical device includes an electrode and a separator and has the presently disclosed laminate set forth above as at least one of the electrode and the separator. The presently disclosed electrochemical device has excellent device characteristics such as rate characteristics and cycle characteristics as a result of the presently disclosed laminate set forth above being used as at least one device member among the electrode and the separator.

The presently disclosed electrochemical device may be a lithium ion secondary battery or an electric double-layer capacitor, for example, but is not specifically limited thereto, and is preferably a lithium ion secondary battery.

Although the following describes a case in which a lithium ion secondary battery is taken as one example of the presently disclosed electrochemical device and in which the presently disclosed laminate set forth above is used as a separator of the lithium ion secondary battery, the presently disclosed electrochemical device is not limited thereto.

<Positive Electrode and Negative Electrode>

Electrodes that are each formed of a known electrode substrate (positive electrode substrate or negative electrode substrate) such as previously described in the "Substrate" section can be used as a positive electrode and a negative electrode.

<Electrolyte Solution>

An organic electrolyte solution having a supporting electrolyte dissolved in an organic solvent is normally used as an electrolyte solution. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrochemical Device>

No specific limitations are placed on the method by which the presently disclosed electrochemical device is produced. For example, the lithium ion secondary battery described above as one example of the presently disclosed electrochemical device can be produced by stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one device member among the positive electrode, the negative electrode, and the separator is the presently disclosed laminate. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer.

In the examples and comparative examples, the following methods were used for evaluation of glass-transition temperature, volume-average particle diameter, degree of swelling in electrolyte solution, average stacking direction height of a heat-resistant region, ratio of volume-average particle diameter of adhesive particles relative to average stacking direction height of a heat-resistant region, ratio (volume ratio and mass ratio) of content of heat-resistant fine particles relative to content of adhesive particles, low-temperature adhesiveness, blocking resistance, and heat resistance of a separator including a functional layer, and rate characteristics and cycle characteristics of a secondary battery.

<Glass-Transition Temperature (Tg) of Adhesive Particles and Binder>

Adhesive particles and a binder were each used as a measurement sample. After measuring 10 mg of the measurement sample into an aluminum pan, measurement thereof by a differential scanning calorimeter (EXSTAR DSC6220 produced by SII NanoTechnology Inc.) was performed under conditions prescribed in JIS Z 8703 in a measurement temperature range of −100° C. to 200° C. and at a heating rate of 10° C./min with an empty aluminum pan as a reference so as to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter of Binder>

The volume-average particle diameter of a binder was measured by laser diffraction. Specifically, a produced water dispersion (adjusted to a solid content concentration of 0.1 mass %) of a binder was used as a sample. A particle diameter distribution (by volume) was measured using a laser diffraction particle size analyzer (LS-230 produced by Beckman Coulter, Inc.), and the particle diameter D50 at which cumulative volume calculated from a small diameter end of the distribution reached 50% was taken to be the volume-average particle diameter.

<Volume-Average Particle Diameter of Heat-Resistant Fine Particles>

In a particle diameter distribution (by volume) measured by laser diffraction, the particle diameter (D50) at which cumulative volume calculated from a small diameter end of the distribution reached 50% was taken to be the volume-average particle diameter of heat-resistant fine particles.

<Volume-Average Particle Diameter of Adhesive Particles in Functional Layer>

The functional layer surface of a separator including a functional layer was observed using a field emission scanning electron microscope (FE-SEM; JSM-7800 Prime produced by JEOL Ltd.; detector: BED-C; accelerating voltage: 5 kV; magnification: ×5,000 to 10,000) with each individual adhesive particle enlarged. The number of observed adhesive particles was 200.

Images of the observed adhesive particles were each binarized, and the area of the adhesive particle in the field of view was determined. Specifically, the binarization (threshold value 38) was performed using image analysis software (WinROOF produced by Mitani Corporation) with emphasis conditions set as "Brightness: −30" and "Contrast: +70", and with a filter set as 7×7 with two threshold values. For each of the 200 SEM images that were obtained, the functional layer surface was observed in plan view, and the area of the adhesive particle was determined. The diameter of the adhesive particle was calculated from the determined area of the adhesive particle by assuming the adhesive particle to be a perfect sphere. Volumes were then calculated from the diameters of the 200 adhesive particles by assuming the adhesive particles to be perfect spheres. A total value for the volumes of all of the adhesive particles was taken to be 100%, the amount of adhesive particles present in each particle diameter interval was expressed as a percentage, and the particle diameter at which the amount of adhesive particles reached 50% was taken to be the volume-average particle diameter of adhesive particles in the functional layer.

<Degree of Swelling in Electrolyte Solution>

A water dispersion containing adhesive particles was loaded into a petri dish made of polytetrafluoroethylene and was dried under conditions of 48 hours at 25° C. to produce a powder. Approximately 0.2 g of the obtained powder was pressed at 200° C. and 5 MPa for 2 minutes to obtain a film. The obtained film was cut to a 1 cm square to obtain a test specimen. The mass W0 of this test specimen was measured.

The test specimen was immersed in electrolyte solution at 60° C. for 72 hours. Thereafter, the test specimen was removed from the electrolyte solution, electrolyte solution on the surface of the test specimen was wiped off, and the mass W1 of the test specimen after the immersion test was measured.

The measured masses W0 and W1 were used to calculate the degree of swelling in electrolyte solution S (factor) by S=W1/W0.

Note that the electrolyte solution was a solution obtained by dissolving $LiPF_6$ as a supporting electrolyte with a concentration of 1 mol/L in a mixed solvent of ethylene carbonate (EC), diethyl carbonate (DEC), and vinylene carbonate (VC) (volume ratio: EC/DEC/VC=68.5/30/1.5).

<Average Stacking Direction Height of Heat-Resistant Region>

A cross-section of a separator including a functional layer was observed using the above-described field emission scanning electron microscope (FE-SEM). The stacking direction height of a heat-resistant region at 5 arbitrary points was measured from the obtained SEM image, and the average stacking direction height of the heat-resistant region was calculated as an average value of these measured values.

<Ratio of Volume-Average Particle Diameter of Adhesive Particles Relative to Average Stacking Direction Height of Heat-Resistant Region>

Values obtained as described above were used to calculate volume-average particle diameter/average stacking direction height.

<Ratio of Content of Heat-Resistant Fine Particles Relative to Content of Adhesive Particles>

The charged amounts of heat-resistant fine particles and adhesive particles in production of a composition for a functional layer were used to determine a ratio (volume ratio and mass ratio) of the content of the heat-resistant fine particles relative to the content of the adhesive particles. Note that the density of alumina particles serving as heat-resistant fine particles was taken to be 4 $g/cm^3$ in this calculation.

<Low-Temperature Adhesiveness>

A positive electrode, a negative electrode, and a separator (including functional layers at both sides) produced in each example or comparative example were each cut out as 10 mm in width and 50 mm in length. The positive electrode and separator were stacked and were then pressed by roll pressing under conditions of a temperature of 50° C., a load of 8 kN/m, and a pressing rate of 30 m/min to obtain a joined product in which the positive electrode and the separator were joined.

The joined product that was obtained was placed with the surface at the current collector-side of the positive electrode facing downward, and cellophane tape was affixed to the surface of the positive electrode. Tape prescribed by JIS Z1522 was used as the cellophane tape. Moreover, the cellophane tape was fixed to a horizontal test stage in advance. Next, one end of the separator was pulled vertically upward at a pulling speed of 50 mm/min to peel off the separator, and the stress during this peeling was measured.

The same operations as for when the positive electrode was used were performed with respect to the negative electrode produced in each example or comparative example so as to perform measurement of stress.

The measurement of stress described above was performed 6 times in total for 3 joined products of a positive electrode and a separator and 3 joined products of a negative electrode and a separator, an average value of the stress was determined, and the obtained average value was taken to be the peel strength (N/m).

The calculated peel strength was used to evaluate the low-temperature adhesiveness of a separator including a functional layer by the following standard. A larger peel strength indicates that the separator can display better low-temperature adhesiveness as a device member through the functional layer.

A: Peel strength of 3 N/m or more

B: Peel strength of not less than 2 N/m and less than 3 N/m

C: Peel strength of not less than 1 N/m and less than 2 N/m

D: Peel strength of less than 1 N/m

<Blocking Resistance>

Two square pieces of 5 cm in width by 5 cm in length were cut out from a produced separator for evaluation (separator including a functional layer at one side of a separator substrate). These two square pieces were overlapped such that surfaces at the functional layer-sides thereof were facing each other. The overlapped separators were then placed under 10 $g/cm^2$ of pressure at 40° C. to obtain a pressed sample. The obtained pressed test specimen was left for 24 hours. After the test specimen had been left for 24 hours, the entire surface at the separator substrate-side of one of the separators was fixed in place and the other separator was pulled with a force of 0.3 N/m so as to observe whether peeling was possible. The blocking state was evaluated by the following standard. When less adhesion is observed, this indicates better blocking resistance.

A: Square pieces are not adhered to each other

B: Square pieces are adhered to each other but can be peeled apart

C: Square pieces are adhered to each other and cannot be peeled apart

<Heat Resistance>

A square of 12 cm in width by 12 cm in length was cut out from a separator produced in each example or comparative example, and then a square with a side length of 10 cm was drawn in an inner part of the obtained square to obtain a test specimen. The test specimen was placed inside a 150° C. thermostatic tank and was left therein for 1 hour. The area change of the square drawn in the inner part (area change={(area of square before being left−area of square after being left)/area of square before being left}×100%) was subsequently determined as the heat shrinkage rate and was evaluated by the following standard. A smaller heat shrinkage rate indicates that a separator including a functional layer has better heat resistance.

A: Heat shrinkage rate of less than 3%

B: Heat shrinkage rate of not less than 3% and less than 5%

C: Heat shrinkage rate of not less than 5% and less than 10%

D: Heat shrinkage rate of 10% or more

<Rate Characteristics>

A produced lithium ion secondary battery was left at rest in a 25° C. environment for 24 hours, was subsequently subjected to a charge/discharge operation of charging to 4.35 V at 0.1C and discharging to 3.0 V at 0.1C in a 25° C. environment, and the initial capacity C0 thereof was measured. Thereafter, the lithium ion secondary battery was subjected to a charge/discharge operation of charging to 4.35 V at 0.1C and discharging to 3.0 V at 2C in a 25° C. environment, and the capacity C1 thereof was measured. Rate characteristics were evaluated through $\Delta C=(C0-C1)/C0\times 100\%$. A larger value for ΔC indicates that the secondary battery has better rate characteristics.

A: ΔC of 90% or more

B: ΔC of not less than 85% and less than 90%

C: ΔC of not less than 80% and less than 85%

D: ΔC of less than 80%

<Cycle Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2C constant-current method at a temperature of 25° C., and was then subjected to 12 hours of aging at a temperature of 60° C. The lithium ion secondary battery was subsequently discharged to a cell voltage of 3.00 V by a 0.2C constant-current method at a temperature of 25° C. Thereafter, the lithium ion secondary battery was CC-CV charged (upper limit cell voltage: 4.20 V) by a 0.2C constant-current method and was CC discharged to 3.00 V by a 0.2C constant-current method. This charging and discharging at 0.2C was repeated three times.

Thereafter, the lithium ion secondary battery was subjected to 100 cycles of a charge/discharge operation with a cell voltage of 4.20 V to 3.00 V and a charge/discharge rate of 1.0C in an environment having a temperature of 25° C. The discharge capacity of the $1^{st}$ cycle was defined as X1 and the discharge capacity of the $100^{th}$ cycle was defined as X2.

A capacity maintenance rate ΔC' was determined using the discharge capacity X1 and the discharge capacity X2 ($\Delta C'=(X2/X1)\times 100(\%)$) and was evaluated by the following standard. A larger value for the capacity maintenance rate ΔC' indicates that the secondary battery has better cycle characteristics.

A: ΔC' of 93% or more

B: ΔC' of not less than 90% and less than 93%

C: ΔC' of less than 90%

Example 1

<Production of Adhesive Particles>

<<Production of Ester Wax>>

A four-necked flask of 0.5 L in capacity having a nitrogen feeding tube, an impeller, and a condenser attached thereto was charged with 18 g (0.13 mol) of pentaerythritol and 104 g (0.52 mol) of lauric acid. A reaction was carried out at 220° C. for 10 hours under a stream of nitrogen while evaporating produced water. Next, 46.5 g of toluene, 32 g of 2-propanol, and 19 g of 10% potassium hydroxide aqueous solution containing potassium hydroxide in an amount of 2.0 equivalents of the acid value were added, 30 minutes of stirring and then 30 minutes of resting were performed at 70° C., and the aqueous layer portion was subsequently removed to obtain a crude product.

The crude product was washed with water four times at 70° C. using 40 parts of deionized water relative to 100 parts of the crude product and was adjusted to a pH of 7. Solvent was evaporated from the resultant purified product under heated and reduced pressure conditions, and then filtration, solidification, and pulverization were performed to yield 140 g of pentaerythritol tetralaurate (melting point: 44° C.) as an ester wax.

<<Production of Saturated Fatty Acid Zinc Salt>>

A separable flask of 3 L in capacity having an impeller attached thereto was charged with 306 g (0.90 mol) of behenic acid as a monobasic linear saturated fatty acid and 2,500 g of water, and these materials were heated to 90° C. Next, 75 g (0.90 mol) of 48% sodium hydroxide aqueous solution was added and was stirred therewith at 90° C. for 1 hour. Thereafter, 291 g (0.45 mol) of 25% zinc sulfate aqueous solution was added dropwise over 1 hour. A further 1 hour of stirring was performed after this dropwise addition was complete.

The resultant slurry was cooled to 65° C. after addition of 1,500 g of water. Thereafter, suction filtration was performed, washing with 1,000 g of water was performed twice, and then 48 hours of drying was performed at 65° C. using a fan dryer to yield zinc behenate as a saturated fatty acid zinc salt.

<<Production of Wax Composition>>

A separable flask of 0.3 L in capacity having an impeller and a nitrogen feeding tube attached thereto was charged with 199.0 g of the above-described pentaerythritol tetralaurate as an ester wax and 1.0 g of the above-described zinc behenate, and was then stirred at 150° C. for 1 hour under a stream of nitrogen. Cooling, solidification, and pulverization were subsequently performed to yield a wax composition.

<<Production of Monomer Composition>>

Mixing was performed with respect to 81.9 parts of styrene as an aromatic vinyl monomer, 18 parts of 2-ethylhexyl acrylate as a (meth)acrylic acid ester monomer, and 0.1 parts of ethylene glycol dimethacrylate as a cross-linkable monomer. The wax composition was then mixed therewith in an amount of 10 parts in terms of the ester wax and was dissolved to produce a monomer composition.

<<Production of Colloidal Dispersion Liquid Containing Dispersion Stabilizer (Metal Hydroxide)>>

An aqueous solution (sodium hydroxide aqueous solution) of 5.6 parts of sodium hydroxide dissolved in 50 parts of deionized water was gradually added under stirring to an aqueous solution (magnesium chloride aqueous solution) of 8.0 parts of magnesium chloride dissolved in 200 parts of deionized water so as to produce a colloidal dispersion liquid containing magnesium hydroxide as a dispersion stabilizer (metal hydroxide).

<<Suspension Polymerization

The above-described monomer composition was added to this colloidal dispersion liquid, was further stirred therewith, and then 2.0 parts of t-butyl peroxy-2-ethylhexanoate (produced by NOF Corporation; product name: PERBUTYL® (polymerization initiator) O) was added as a polymerization initiator to obtain a mixture. The obtained mixture was subjected to 1 minute of high-shear stirring at a rotation speed of 15,000 rpm using an inline emulsifying/dispersing device (produced by Pacific Machinery & Engineering Co., Ltd.; product name: CAVITRON) so as to form droplets of the monomer composition in the colloidal dispersion liquid.

The colloidal dispersion liquid having droplets of the monomer composition formed therein was loaded into a reactor and was heated to 90° C. and caused to undergo a polymerization reaction for 5 hours to yield a water dispersion containing adhesive particles.

This water dispersion containing adhesive particles was used to measure the degree of swelling in electrolyte solution. The result is shown in Table 1.

<<Drying>>

The water dispersion containing adhesive particles was stirred while adding sulfuric acid dropwise at room temperature (25° C.) and performing acid washing until the pH was 6.5 or lower. Next, separation by filtration was performed, 500 parts of deionized water was added to the obtained solid content to form a slurry once again, and water washing treatment (washing, filtration, and dehydration) was repeated a number of times. Separation by filtration was then performed, and the obtained solid content was loaded into a vessel of a dryer and was dried at 40° C. for 48 hours to yield dried adhesive particles.

The glass-transition temperature of the obtained adhesive particles was measured. The result is shown in Table 1.

<Production of Binder>

A reactor including a stirrer was supplied with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate as a polymerization initiator, the gas phase was purged with nitrogen gas, and the temperature was raised to 60° C.

Meanwhile, a monomer composition was produced in a separate vessel by mixing 50 parts of deionized water, 0.5 parts of sodium dodecylbenzenesulfonate as a dispersion stabilizer, 94 parts of n-butyl acrylate as a (meth)acrylic acid ester monomer, 2 parts of methacrylic acid as an acid group-containing monomer, 2 parts of acrylonitrile as a nitrile group-containing monomer, and 1 part of allyl methacrylate and 1 part of allyl glycidyl ether as cross-linkable monomers.

The obtained monomer composition was continuously added into the aforementioned reactor including a stirrer over 4 hours to perform polymerization. The reaction was carried out at 60° C. during the addition. Once this addition was complete, a further 3 hours of stirring was performed at 70° C., and then the reaction was ended to yield a water dispersion containing a particulate binder as an acrylic polymer. The obtained binder had a volume-average particle diameter of 0.25 μm and a glass-transition temperature of −40° C.

<Production of Composition for Functional Layer>

An alumina-containing slurry was obtained by adding 0.5 parts of polyacrylic acid as a water-soluble polymer to 100 parts of alumina (AKP3000 produced by Sumitomo Chemical Co., Ltd.; volume-average particle diameter: 0.7 μm) as heat-resistant fine particles, further adding deionized water to adjust the solid content concentration to 55%, and performing mixing thereof using a ball mill.

In addition, an adhesive particle-containing mixture having a solid content concentration of 40% was obtained by mixing 100 parts of the above-described adhesive particles, 0.2 parts of sodium dodecylbenzenesulfonate (NEOPELEX G-15 produced by Kao Corporation) as a dispersant, and deionized water.

The alumina-containing slurry and the adhesive particle-containing mixture were mixed such that the ratio (alumina/adhesive particles) of the alumina and the adhesive particles was 70/30 by volume (90/10 by mass). Deionized water, 6 parts in terms of solid content of the water dispersion containing the binder described above, and 1.5 parts of carboxymethyl cellulose as a water-soluble polymer (thickener) per 100 parts of alumina were then added to the resultant mixture to obtain a composition for a functional layer (solid content concentration: 40%).

<Production of Separator Including Functional Layer>

A microporous membrane (thickness: 12 μm) made of polyethylene was prepared as a separator substrate. The composition for a functional layer obtained as described above was applied onto one side of the prepared separator substrate by bar coating. The coating film was dried at 50° C. Next, the same operations as described above were performed with respect to the other side of the separator substrate to obtain a functional layer-equipped separator that included functional layers at both sides of the separator substrate. The two functional layers of the obtained separator both included adhesion regions formed of the adhesive particles and heat-resistant regions formed of alumina serving as heat-resistant fine particles, and the average stacking direction height of the heat-resistant regions was 2.0 μm. Moreover, the volume-average particle diameter of the adhesive particles was 6.0 μm for each of the functional layers.

Furthermore, low-temperature adhesiveness and heat resistance were evaluated for this separator including functional layers at both sides. The results are shown in Table 1.

Separately to the above, the composition for a functional layer obtained as described above was applied onto one side of a separator substrate (microporous membrane made of polyethylene; thickness: 12 μm) by bar coating, and the coating film was dried at 50° C. to obtain a functional layer-equipped separator including a functional layer at one side of the separator substrate. This separator including a functional layer at one side was used as a separator for evaluation in order to evaluate blocking resistance. The result is shown in Table 1.

<Production of Positive Electrode>

A slurry composition for a positive electrode was produced by mixing 100 parts of $LiCoO_2$ (volume-average particle diameter: 12 μm) as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone as a solvent, adjusting these materials to a total solid content concentration of 70%, and mixing these materials in a planetary mixer.

The slurry composition for a positive electrode was applied onto aluminum foil of 20 μm in thickness serving as a current collector using a comma coater such as to have a thickness after drying of approximately 150 μm. The slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a positive electrode including a positive electrode mixed material layer (thickness: 60 μm).

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, the reaction was quenched by cooling to yield a mixture containing a binder (SBR) for a negative electrode mixed material layer. The mixture containing the binder for a negative electrode mixed material layer was adjusted to pH 8 through addition of 5% sodium hydroxide aqueous solution and was subsequently subjected to thermal-vacuum distillation to remove unreacted monomer. Thereafter, the mixture was cooled to 30° C. or lower to obtain a water dispersion containing the target binder for a negative electrode mixed material layer.

After blending 80 parts of artificial graphite (volume-average particle diameter: 15.6 μm) and 16 parts of a silicon-based active material $SiO_x$ (volume-average particle diameter: 4.9 μm) as negative electrode active materials and then mixing 2.5 parts in terms of solid content of a 2% aqueous solution of carboxymethyl cellulose sodium salt (MAC350HC produced by Nippon Paper Industries Co., Ltd.) as a viscosity modifier and deionized water therewith to adjust the solid content concentration to 68%, a further 60 minutes of mixing was performed at 25° C. The solid content concentration was further adjusted to 62% with deionized water, and then a further 15 minutes of mixing was performed at 25° C. to obtain a mixture. Deionized water and 1.5 parts in terms of solid content of the water dispersion containing the binder for a negative electrode mixed material layer described above were added to this mixture, the final solid content concentration was adjusted to 52%, and a further 10 minutes of mixing was performed to obtain a mixture. This mixture was subjected to defoaming under reduced pressure to yield a slurry composition for a negative electrode having good fluidity.

The slurry composition for a negative electrode was applied onto copper foil of 20 μm in thickness serving as a current collector using a comma coater such as to have a thickness after drying of approximately 150 μm. The slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a negative electrode including a negative electrode mixed material layer (thickness: 80 μm).

<Production of Lithium Ion Secondary Battery>

The positive electrode produced as described above was cut out as a rectangle of 49 cm×5 cm and was placed such that the surface at the positive electrode mixed material layer-side thereof faced upward. A separator (including functional layers at both sides) that had been cut out as 120 cm×5.5 cm was arranged on the positive electrode mixed material layer of the positive electrode such that the positive electrode was positioned at one side of the separator in a longitudinal direction. In addition, the negative electrode produced as described above was cut out as a rectangle of 50 cm×5.2 cm and was arranged on the separator such that the surface at the negative electrode mixed material layer-side thereof faced toward the separator and such that the negative electrode was positioned at the other side of the separator in the longitudinal direction. The resultant laminate was wound by a winding machine to obtain a roll.

This roll was pressed into a flattened form at 50° C. and 1 MPa, was subsequently enclosed in an aluminum packing case serving as a battery case, and then electrolyte solution (solvent: ethylene carbonate/diethyl carbonate/vinylene carbonate (volume ratio)=68.5/30/1.5; electrolyte: $LiPF_6$ of 1 mol in concentration) was injected such that no air remained. An opening of the aluminum packing case was then closed by heat sealing at a temperature of 150° C. to produce a wound lithium ion secondary battery having a capacity of 800 mAh.

Rate characteristics and cycle characteristics were evaluated for the obtained lithium ion secondary battery. The results are shown in Table 1.

Examples 2 to 5

Adhesive particles, a binder, a composition for a functional layer, a separator, a negative electrode, a positive electrode, and a lithium ion secondary battery were obtained in the same way as in Example 1 with the exception that the amount of the wax composition (in terms of ester wax) was changed to 5 parts (Example 2), 15 parts (Example 3), 20 parts (Example 4), or 25 parts (Example 5) in production of the adhesive particles. Various evaluations were performed in the same way as in Example 1. The results are shown in Table 1.

Example 6

In production of an ester wax, behenic acid was used instead of lauric acid so as to obtain pentaerythritol tetrabehenate (melting point: 81° C.) as an ester wax. Adhesive particles, a binder, a composition for a functional layer, a separator, a negative electrode, a positive electrode, and a lithium ion secondary battery were then obtained in the same way as in Example 1 with the exception that this ester wax was used. Various evaluations were performed in the same way as in Example 1. The results are shown in Table 1.

Example 7

Adhesive particles, a binder, a composition for a functional layer, a separator, a negative electrode, a positive electrode, and a lithium ion secondary battery were obtained in the same way as in Example 1 with the exception that a monomer composition produced as described below was used in production of the adhesive particles. Various evaluations were performed in the same way as in Example 1. The results are shown in Table 1.

<Production of Monomer Composition>

Mixing was performed with respect to 82 parts of styrene as an aromatic vinyl monomer and 18 parts of 2-ethylhexyl acrylate as a (meth)acrylic acid ester monomer. A wax composition produced in the same way as in Example 1 was then mixed therewith in an amount of 10 parts in terms of the ester wax and was dissolved to produce a monomer composition.

Example 8

Adhesive particles, a binder, a composition for a functional layer, a separator, a negative electrode, a positive electrode, and a lithium ion secondary battery were obtained in the same way as in Example 1 with the exception that a colloidal dispersion liquid produced as described below was used in production of the adhesive particles. Various evaluations were performed in the same way as in Example 1. The results are shown in Table 1.

<Production of Colloidal Dispersion Liquid Containing Dispersion Stabilizer (Metal Hydroxide)>

An aqueous solution (sodium hydroxide aqueous solution) of 7.0 parts of sodium hydroxide dissolved in 50 parts of deionized water was gradually added under stirring to an aqueous solution (magnesium chloride aqueous solution) of 10.0 parts of magnesium chloride dissolved in 200 parts of deionized water so as to produce a colloidal dispersion liquid containing magnesium hydroxide as a dispersion stabilizer (metal hydroxide).

Example 9

Adhesive particles, a binder, a composition for a functional layer, a separator, a negative electrode, a positive electrode, and a lithium ion secondary battery were obtained in the same way as in Example 1 with the exception that a colloidal dispersion liquid produced as described below was used in production of the adhesive particles. Various evaluations were performed in the same way as in Example 1. The results are shown in Table 1.

<Production of Colloidal Dispersion Liquid Containing Dispersion Stabilizer (Metal Hydroxide)>

An aqueous solution (sodium hydroxide aqueous solution) of 4.2 parts of sodium hydroxide dissolved in 50 parts of deionized water was gradually added under stirring to an aqueous solution (magnesium chloride aqueous solution) of 6.0 parts of magnesium chloride dissolved in 200 parts of deionized water so as to produce a colloidal dispersion liquid containing magnesium hydroxide as a dispersion stabilizer (metal hydroxide).

Example 10

Adhesive particles, a binder, a composition for a functional layer, a separator, a negative electrode, a positive electrode, and a lithium ion secondary battery were obtained in the same way as in Example 1 with the exception that 5 parts of paraffin wax (produced by Nippon Seiro Co., Ltd.; product name: HNP-11) was used as a wax composition in production of the adhesive particles. Various evaluations were performed in the same way as in Example 1. The results are shown in Table 1.

Examples 11 and 12

Adhesive particles, a binder, a composition for a functional layer, a separator, a negative electrode, a positive electrode, and a lithium ion secondary battery were obtained in the same way as in Example 1 with the exception that the alumina-containing slurry and the adhesive particle-containing mixture were mixed such that the mixing ratio (alumina particles/adhesive particles) of the alumina particles and the adhesive particles was 80/20 by volume (94/6 by mass) or 55/45 by volume (82/18 by mass) in production of the composition for a functional layer. Various evaluations were performed in the same way as in Example 1. The results are shown in Table 2.

Example 13

Adhesive particles, a binder, a composition for a functional layer, a separator, a negative electrode, a positive electrode, and a lithium ion secondary battery were obtained in the same way as in Example 1 with the exception that a monomer composition produced as described below was used in production of the adhesive particles. Various evaluations were performed in the same way as in Example 1. The results are shown in Table 2.

<Production of Monomer Composition>

Mixing was performed with respect to 83.9 parts of styrene as an aromatic vinyl monomer, 16 parts of 2-ethylhexyl acrylate as a (meth)acrylic acid ester monomer, and 0.1 parts of ethylene glycol dimethacrylate as a cross-linkable monomer. A wax composition produced in the same way as in Example 1 was then mixed therewith in an amount of 10 parts in terms of the ester wax and was dissolved to produce a monomer composition.

Example 14

Adhesive particles, a binder, a composition for a functional layer, a separator, a negative electrode, a positive electrode, and a lithium ion secondary battery were obtained in the same way as in Example 1 with the exception that a monomer composition produced as described below was used in production of the adhesive particles. Various evaluations were performed in the same way as in Example 1. The results are shown in Table 2.

<Production of Monomer Composition>

Mixing was performed with respect to 72.9 parts of styrene as an aromatic vinyl monomer, 27 parts of 2-ethylhexyl acrylate as a (meth)acrylic acid ester monomer, and 0.1 parts of ethylene glycol dimethacrylate as a cross-linkable monomer. A wax composition produced in the same way as in Example 1 was then mixed therewith in an amount of 10 parts in terms of the ester wax and was dissolved to produce a monomer composition.

Example 15

Adhesive particles, a binder, a composition for a functional layer, a separator, a negative electrode, a positive electrode, and a lithium ion secondary battery were obtained in the same way as in Example 1 with the exception that organic fine particles produced as described below were used instead of alumina particles in production of the composition for a functional layer. Various evaluations were performed in the same way as in Example 1. The results are shown in Table 2.

<Production of Organic Fine Particles (Heat-Resistant Fine Particles)>

A reactor A including a stirrer was charged with 0.20 parts of sodium dodecyl sulfate, 0.30 parts of ammonium persulfate, and 180 parts of deionized water. These materials were mixed to obtain a mixture and were heated to 65° C. Meanwhile, a monomer composition for seed particles was produced in a separate vessel by mixing 80.0 parts of n-butyl acrylate as a (meth)acrylic acid ester monomer, 10.0 parts of methacrylic acid as an acid group-containing monomer, 10.0 parts of acrylonitrile as a nitrile group-containing monomer, 0.8 parts of sodium dodecyl sulfate, and 40 parts of deionized water.

This monomer composition for seed particles was continuously added into the aforementioned reactor A over 4 hours to carry out a polymerization reaction. The internal temperature of the reactor during continuous addition of the monomer composition for seed particles was maintained at 65° C. Moreover, once the continuous addition was complete, the polymerization reaction was continued for a further 3 hours at 80° C. This yielded a water dispersion of seed particles. The volume-average particle diameter of the seed particles measured in the same way as for a binder was 120 nm.

Next, 20 parts in terms of solid content of the water dispersion of seed particles described above (composed of 16 parts of n-butyl acrylate units, 2 parts of methacrylic acid units, and 2 parts of acrylonitrile units), 80 parts of ethylene glycol dimethacrylate (produced by Kyoeisha Chemical Co., Ltd.; product name: LIGHT ESTER EG) as a cross-linkable monomer, 0.8 parts of sodium dodecylbenzenesulfonate, 3.2 parts of t-butyl peroxy-2-ethylhexanoate (produced by NOF Corporation; product name: PERBUTYL® (polymerization initiator) O) as a polymerization initiator, and 160 parts of deionized water were loaded into a reactor including a stirrer and were stirred at 35° C. for 12 hours to cause complete absorption of the cross-linkable monomer and the polymerization initiator by the seed particles. The internal temperature of the reactor was subsequently maintained at 90° C. while carrying out a polymerization reaction (seeded polymerization) for 5 hours.

Next, unreacted monomer and initiator decomposition product were removed through introduction of steam so as to obtain a water dispersion of organic fine particles. The glass-transition temperature of the obtained organic fine particles was measured by the same method as for adhesive particles and a binder, but a peak was not observed in the measurement temperature range (−100° C. to 200° C.). Thus, the glass-transition temperature of the organic fine particles was confirmed to be higher than 200° C.

Example 16

Adhesive particles, a binder, a composition for a functional layer, a separator, a negative electrode, a positive electrode, and a lithium ion secondary battery were obtained in the same way as in Example 1 with the exception that zinc behenate was not produced as a saturated fatty acid zinc salt and that zinc behenate was not added to pentaerythritol tetralaurate serving as an ester wax in production of the adhesive particles. Various evaluations were performed in the same way as in Example 1. The results are shown in Table 2.

Comparative Example 1

Adhesive particles, a binder, a composition for a functional layer, a separator, a negative electrode, a positive electrode, and a lithium ion secondary battery were obtained in the same way as in Example 1 with the exception that a wax composition was not used in production of the adhesive particles. Various evaluations were performed in the same way as in Example 1. The results are shown in Table 2.

Comparative Example 2

Adhesive particles, a binder, a composition for a functional layer, a separator, a negative electrode, a positive electrode, and a lithium ion secondary battery were obtained in the same way as in Example 1 with the exception that a monomer composition (not containing a wax composition) produced as described below was used in production of the adhesive particles. Various evaluations were performed in the same way as in Example 1. The results are shown in Table 2.

<Production of Monomer Composition>

Mixing was performed with respect to 60.9 parts of styrene as an aromatic vinyl monomer, 39 parts of 2-ethylhexyl acrylate as a (meth)acrylic acid ester monomer, and 0.1 parts of ethylene glycol dimethacrylate as a cross-linkable monomer to produce a monomer composition.

Comparative Example 3

Adhesive particles, a binder, a composition for a functional layer, a separator, a negative electrode, a positive electrode, and a lithium ion secondary battery were obtained in the same way as in Example 1 with the exception that polyethylene wax (melting point: 95° C.; number-average molecular weight: 7,300) was used instead of pentaerythritol tetralaurate serving as an ester wax in production of the wax composition. Various evaluations were performed in the same way as in Example 1. The results are shown in Table 2.

Comparative Example 4

A lithium ion secondary battery was obtained in the same way as in Example 1 with the exception that a separator produced as described below was used. Various evaluations were performed in the same way as in Example 1. The results are shown in Table 2.

<Production of Separator (Including Functional Layer at Both Sides or One Side)>

A composition for a functional layer was obtained by adding 0.2 parts of sodium dodecylbenzenesulfonate (NEOPELEX G-15 produced by Kao Corporation) as a dispersant and 6 parts in terms of solid content of a water dispersion containing a binder that was produced in the same way as in Example 1 to 100 parts of adhesive particles that were produced in the same way as in Example 1, and then further adding and mixing deionized water so as to adjust the solid content concentration to 40%.

A microporous membrane (thickness: 12 µm) made of polyethylene was prepared as a separator substrate. The composition for a functional layer obtained as described above was applied onto one surface of the prepared separator substrate by bar coating such as to have a coating weight of 0.3 $g/m^2$. The coating film was dried at 50° C. Next, the same operations as described above were performed with respect to the other side of the separator substrate to obtain a separator that included functional layers at both sides of the separator substrate.

Separately to the above, the composition for a functional layer obtained as described above was applied onto one side of a separator substrate (microporous membrane made of polyethylene; thickness: 12 μm) by bar coating, and the coating film was dried at 50° C. to obtain a separator including a functional layer at one side of the separator substrate.

In Tables 1 and 2, shown below:

"ST" indicates styrene unit;

"2EHA" indicates 2-ethylhexyl acrylate unit;

"EDMA" indicates ethylene glycol dimethacrylate unit;

"Acrylic" indicates acrylic polymer;

"PE" indicates microporous membrane made of polyethylene;

"Particle diameter" indicates volume-average particle diameter;

"Degree of swelling" indicates degree of swelling in electrolyte solution;

"Height of heat-resistant region" indicates average stacking direction height of heat-resistant region; and "Organic" indicates organic fine particles.

TABLE 1

| | | | | | | Example 1 | Example 2 | Example 3 | Example 4 | Example 5 |
|---|---|---|---|---|---|---|---|---|---|---|
| Laminate | Functional layer | Heat-resistant fine particles | Type | | | Alumina | Alumina | Alumina | Alumina | Alumina |
| | | | Particle diameter [μm] | | | 0.5 | 0.5 | 0.5 | 0.5 | 0.5 |
| | | Adhesive particles | Adhesive polymer | Aromatic vinyl monomer unit | Type | ST | ST | ST | ST | ST |
| | | | | | Proportion [mass %] | 81.9 | 81.9 | 81.9 | 81.9 | 81.9 |
| | | | | (Meth)acrylic acid ester monomer unit | Type | 2EHA | 2EHA | 2EHA | 2EHA | 2EHA |
| | | | | | Proportion [mass %] | 18 | 18 | 18 | 18 | 18 |
| | | | | Cross-linkable monomer unit | Type | EDMA | EDMA | EDMA | EDMA | EDMA |
| | | | | | Proportion [mass %] | 0.1 | 0.1 | 0.1 | 0.1 | 0.1 |
| | | | Wax | Type | | Ester wax | Ester wax | Ester wax | Ester wax | Ester wax |
| | | | | Melting point [° C.] | | 44 | 44 | 44 | 44 | 44 |
| | | | | Content [parts by mass] (relative to 100 parts of adhesive polymer) | | 10 | 5 | 15 | 20 | 25 |
| | | | Saturated fatty acid zinc salt | | | Yes | Yes | Yes | Yes | Yes |
| | | | Particle diameter [μm] | | | 6 | 6 | 6 | 6 | 6 |
| | | | Degree of swelling [factor] | | | 2 | 2 | 2 | 2 | 2 |
| | | | Tg [° C.] | | | 55 | 59 | 53 | 50 | 47 |
| | | Binder | Type | | | Acrylic | Acrylic | Acrylic | Acrylic | Acrylic |
| | | | Content [parts by mass] (relative to 100 parts of heat-resistant fine particles) | | | 6 | 6 | 6 | 6 | 6 |
| | | Heat-resistant fine particles/Adhesive particles | | | Volume ratio | 70/30 | 70/30 | 70/30 | 70/30 | 70/30 |
| | | | | | Mass ratio | 90/10 | 90/10 | 90/10 | 90/10 | 90/10 |
| | | Height of heat-resistant region [μm] | | | | 2 | 2 | 2 | 2 | 2 |
| | | Particle diameter of adhesive particles/Height of heat-resistant region [−] | | | | 3 | 3 | 3 | 3 | 3 |
| | Substrate | Type | | | | PE | PE | PE | PE | PE |
| Low-temperature adhesiveness | | | | | | A | B | A | A | A |
| Heat resistance | | | | | | A | A | A | A | A |
| Blocking resistance | | | | | | A | A | A | A | B |
| Rate characteristics | | | | | | A | A | B | B | B |
| Cycle characteristics | | | | | | A | A | A | B | B |
| | | | | | | Example 6 | Example 7 | Example 8 | Example 9 | Example 10 |
| Laminate | Functional layer | Heat-resistant fine particles | Type | | | Alumina | Alumina | Alumina | Alumina | Alumina |
| | | | Particle diameter [μm] | | | 0.5 | 0.5 | 0.5 | 0.5 | 0.5 |
| | | Adhesive particles | Adhesive polymer | Aromatic vinyl monomer unit | Type | ST | ST | ST | ST | ST |
| | | | | | Proportion [mass %] | 81.9 | 82 | 81.9 | 81.9 | 81.9 |
| | | | | (Meth)acrylic acid ester monomer unit | Type | 2EHA | 2EHA | 2EHA | 2EHA | 2EHA |
| | | | | | Proportion [mass %] | 18 | 18 | 18 | 18 | 18 |
| | | | | Cross-linkable monomer unit | Type | EDMA | — | EDMA | EDMA | EDMA |
| | | | | | Proportion [mass %] | 0.1 | — | 0.1 | 0.1 | 0.1 |
| | | | Wax | Type | | Ester wax | Ester wax | Ester wax | Ester wax | Paraffin wax |
| | | | | Melting point [° C.] | | 81 | 44 | 44 | 44 | 68 |
| | | | | Content [parts by mass] (relative to 100 parts of adhesive polymer) | | 10 | 10 | 10 | 10 | 5 |
| | | | Saturated fatty acid zinc salt | | | Yes | Yes | Yes | Yes | — |
| | | | Particle diameter [μm] | | | 6 | 6 | 3 | 9 | 6 |
| | | | Degree of swelling [factor] | | | 2 | 2 | 2 | 2 | 2 |
| | | | Tg [° C.] | | | 63 | 55 | 55 | 55 | 62 |

TABLE 1-continued

| | | | | | | | | | |
|---|---|---|---|---|---|---|---|---|---|
| | Binder | Type | | | Acrylic | Acrylic | Acrylic | Acrylic | Acrylic |
| | | Content [parts by mass] (relative to 100 parts of heat-resistant fine particles) | | | 6 | 6 | 6 | 6 | 6 |
| | Heat-resistant fine particles/ | | | Volume ratio | 70/30 | 70/30 | 70/30 | 70/30 | 70/30 |
| | Adhesive particles | | | Mass ratio | 90/10 | 90/10 | 90/10 | 90/10 | 90/10 |
| | Height of heat-resistant region [μm] | | | | 2 | 2 | 2 | 2 | 2 |
| | Particle diameter of adhesive particles/Height of heat-resistant region [−] | | | | 3 | 3 | 1.5 | 4.5 | 3 |
| Substrate | Type | | | | PE | PE | PE | PE | PE |
| Low-temperature adhesiveness | | | | | B | B | B | B | B |
| Heat resistance | | | | | A | A | B | A | A |
| Blocking resistance | | | | | A | A | B | A | A |
| Rate characteristics | | | | | A | A | A | A | A |
| Cycle characteristics | | | | | A | A | A | A | A |

TABLE 2

| | | | | | | Example 11 | Example 12 | Example 13 | Example 14 | Example 15 |
|---|---|---|---|---|---|---|---|---|---|---|
| Laminate | Functional layer | Heat-resistant fine particles | Type | | | Alumina | Alumina | Alumina | Alumina | Organic |
| | | | Particle diameter [μm] | | | 0.5 | 0.5 | 0.5 | 0.5 | 0.2 |
| | | Adhesive particles | Adhesive polymer | Aromatic vinyl monomer unit | Type | ST | ST | ST | ST | ST |
| | | | | | Proportion [mass %] | 81.9 | 81.9 | 83.9 | 72.9 | 81.9 |
| | | | | (Meth)acrylic acid ester monomer unit | Type | 2EHA | 2EHA | BA | 2EHA | 2EHA |
| | | | | | Proportion [mass %] | 18 | 18 | 16 | 27 | 18 |
| | | | | Cross-linkable monomer unit | Type | EDMA | EDMA | EDMA | EDMA | EDMA |
| | | | | | Proportion [mass %] | 0.1 | 0.1 | 0.1 | 0.1 | 0.1 |
| | | | Wax | Type | | Ester wax | Ester wax | Ester wax | Ester wax | Ester wax |
| | | | | Melting point [° C.] | | 44 | 44 | 44 | 44 | 44 |
| | | | | Content [parts by mass] (relative to 100 parts of adhesive polymer) | | 10 | 10 | 10 | 5 | 10 |
| | | | Saturated fatty acid zinc salt | | | Yes | Yes | Yes | Yes | Yes |
| | | | Particle diameter [μm] | | | 6 | 6 | 6 | 6 | 6 |
| | | | Degree of swelling [factor] | | | 2 | 2 | 2 | 2 | 2 |
| | | | Tg [° C.] | | | 55 | 55 | 55 | 45 | 55 |
| | | Binder | Type | | | Acrylic | Acrylic | Acrylic | Acrylic | Acrylic |
| | | | Content [parts by mass] (relative to 100 parts of heat-resistant fine particles) | | | 6 | 6 | 6 | 6 | 6 |
| | | Heat-resistant fine particles/ | | | Volume ratio | 80/20 | 55/45 | 70/30 | 70/30 | 70/30 |
| | | Adhesive particles | | | Mass ratio | 94/6 | 82/18 | 90/10 | 90/10 | 70/10 |
| | | Height of heat-resistant region [μm] | | | | 2 | 2 | 2 | 2 | 2 |
| | | Particle diameter of adhesive particles/Height of heat-resistant region [−] | | | | 3 | 3 | 3 | 3 | 3 |
| | Substrate | Type | | | | PE | PE | PE | PE | PE |
| Low-temperature adhesiveness | | | | | | B | A | A | A | A |
| Heat resistance | | | | | | A | B | A | A | B |
| Blocking resistance | | | | | | A | A | A | A | A |
| Rate characteristics | | | | | | A | A | A | A | A |
| Cycle characteristics | | | | | | A | A | A | A | A |

| | | | | | | Example 16 | Comparative Example 1 | Comparative Example 2 | Comparative Example 3 | Comparative Example 4 |
|---|---|---|---|---|---|---|---|---|---|---|
| Laminate | Functional layer | Heat-resistant fine particles | Type | | | Alumina | Alumina | Alumina | Alumina | — |
| | | | Particle diameter [μm] | | | 0.5 | 0.5 | 0.5 | 0.5 | — |
| | | Adhesive particles | Adhesive polymer | Aromatic vinyl monomer unit | Type | ST | ST | ST | ST | ST |
| | | | | | Proportion [mass %] | 81.9 | 81.9 | 60.9 | 81.9 | 81.9 |
| | | | | (Meth)acrylic acid ester monomer unit | Type | 2EHA | 2EHA | 2EHA | 2EHA | 2EHA |
| | | | | | Proportion [mass %] | 18 | 18 | 39 | 18 | 18 |
| | | | | Cross-linkable monomer unit | Type | EDMA | EDMA | EDMA | EDMA | EDMA |
| | | | | | Proportion [mass %] | 0.1 | 0.1 | 0.1 | 0.1 | 0.1 |
| | | | Wax | Type | | Ester wax | — | — | Polyethylene wax | Ester wax |
| | | | | Melting point [° C.] | | 44 | — | — | 95 | 44 |
| | | | | Content [parts by mass] | | 10 | — | — | 5 | 10 |

TABLE 2-continued

| | | | | | | | | |
|---|---|---|---|---|---|---|---|---|
| | | (relative to 100 parts of adhesive polymer) | | | | | | |
| | | Saturated fatty acid zinc salt | | — | — | — | Yes | Yes |
| | | Particle diameter [μm] | | 6 | 6 | 6 | 6 | 6 |
| | | Degree of swelling [factor] | | 2 | 2 | 2 | 2 | 2 |
| | | Tg [° C.] | | 55 | 66 | 38 | 66 | 66 |
| | Binder | Type | | Acrylic | Acrylic | Acrylic | Acrylic | Acrylic |
| | | Content [parts by mass] (relative to 100 parts of heat-resistant fine particles) | | 6 | 6 | 6 | 6 | 6 |
| | Heat-resistant fine particles/ | | Volume ratio | 70/30 | 70/30 | 70/30 | 70/30 | 0/100 |
| | Adhesive particles | | Mass ratio | 90/10 | 90/10 | 90/10 | 90/10 | 0/100 |
| | Height of heat-resistant region [μm] | | | 2 | 2 | 2 | 2 | — |
| | Particle diameter of adhesive particles/Height of heat-resistant region [–] | | | 3 | 3 | 3 | 3 | 3 |
| Substrate | Type | | | PE | PE | PE | PE | PE |
| Low-temperature adhesiveness | | | | A | D | A | D | C |
| Heat resistance | | | | A | A | A | A | D |
| Blocking resistance | | | | A | A | C | A | A |
| Rate characteristics | | | | A | A | A | A | D |
| Cycle characteristics | | | | A | A | A | A | C |

It can be seen from Tables 1 and 2 that the laminates of Examples 1 to 16 can each be used well as a separator having excellent low-temperature adhesiveness, blocking resistance, and heat resistance. It can also be seen that a secondary battery having excellent rate characteristics and cycle characteristics is obtained in Examples 1 to 16.

In contrast, it can be seen that low-temperature adhesiveness of a separator formed of a laminate decreases in Comparative Example 1 in which a functional layer of the laminate is produced using adhesive particles that do not contain a wax.

It can also be seen that although low-temperature adhesiveness of a separator formed of a laminate can be ensured in Comparative Example 2 in which a functional layer of the laminate is produced using adhesive particles having a low glass-transition temperature that do not contain a wax, blocking resistance of the separator decreases.

It can also be seen that low-temperature adhesiveness of a separator formed of a laminate decreases in Comparative Example 3 in which a functional layer of the laminate is produced using adhesive particles containing a wax that has a melting point of 95° C. or higher.

It can also be seen that low-temperature adhesiveness and heat resistance of a separator formed of a laminate decrease and rate characteristics and cycle characteristics of a secondary battery deteriorate in Comparative Example 4 in which a functional layer of the laminate is produced using a composition for a functional layer that does not contain heat-resistant fine particles.

INDUSTRIAL APPLICABILITY

According to the present disclosure, it is possible to provide a laminate for an electrochemical device that can advantageously be used as a device member having excellent low-temperature adhesiveness and blocking resistance, and also to provide an electrochemical device including this laminate for an electrochemical device as a device member.

REFERENCE SIGNS LIST

100 laminate
10 functional layer
11 adhesion region
11*a* adhesive particle
12 heat-resistant region
12*a* heat-resistant fine particle
20 substrate
T stacking direction height of heat-resistant region
D particle diameter of adhesive particle

The invention claimed is:

1. A laminate for an electrochemical device comprising: a functional layer containing heat-resistant fine particles and adhesive particles; and a substrate, wherein each of the adhesive particles contains an adhesive polymer, the adhesive polymer including an aromatic vinyl monomer unit, and each of the adhesive particles also contains a wax that has a melting point of lower than 95° C., the functional layer includes an adhesion region formed of the adhesive particles and a heat-resistant region formed of the heat-resistant fine particles in plan view from a side corresponding to the functional layer, the adhesive particles have a volume-average particle diameter that is larger than an average stacking direction height of the heat-resistant region, a content of the wax in the adhesive particles per 100 parts by mass of the adhesive polymer is 5 parts by mass or more and 25 parts by mass or less, and the wax is at least one selected from the group consisting of candelilla wax, rice bran wax, Japan wax, jojoba oil, animal wax, paraffin wax, microcrystalline wax, petrolatum wax, polybutylene wax, behenyl stearate, pentaerythritol ester, and dipentaerythritol ester.

2. The laminate for an electrochemical device according to claim 1, wherein the volume-average particle diameter of the adhesive particles is not less than 1.0 μm and not more than 10.0 μm.

3. The laminate for an electrochemical device according to claim 1, wherein a ratio of the volume-average particle diameter of the adhesive particles relative to the average stacking direction height of the heat-resistant region is not less than 1.1 and not more than 10.0.

4. The laminate for an electrochemical device according to claim 1, wherein the adhesive particles have a glass-transition temperature of not lower than 10° C. and not higher than 90° C.

5. The laminate for an electrochemical device according to claim 1, wherein the adhesive polymer further includes a cross-linkable monomer unit.

6. The laminate for an electrochemical device according to claim 1, wherein the heat-resistant fine particles are inorganic fine particles.

7. The laminate for an electrochemical device according to claim 1, wherein the wax is at least one selected from the group consisting of behenyl stearate, pentaerythritol ester, and dipentaerythritol ester.

8. The laminate for an electrochemical device according to claim 1, wherein the melting point of the wax is 40° C. or higher.

9. The laminate for an electrochemical device according to claim 1, wherein a volume ratio of content of the heat-resistant fine particles relative to content of the adhesive particles in the functional layer is not less than 55/45 and not more than 95/5.

10. An electrochemical device comprising an electrode and a separator, wherein at least one of the electrode and the separator is formed using the laminate for an electrochemical device according to claim 1.

11. The laminate for an electrochemical device according to claim 1, wherein the adhesive polymer further includes a (meth)acrylic acid ester monomer unit.

12. The laminate for an electrochemical device according to claim 1, wherein the content of the wax in the adhesive particles per 100 parts by mass of the adhesive polymer is 10 parts by mass or more and 20 parts by mass or less.

13. The laminate for an electrochemical device according to claim 7, wherein the pentaerythritol ester is a fatty acid ester of pentaerythritol.

14. The laminate for an electrochemical device according to claim 13, wherein the fatty acid ester of pentaerythritol is at least one selected from the group consisting of pentaerythritol tetramyristate, pentaerythritol tetrapalmitate, pentaerythritol tetrastearate, pentaerythritol tetralaurate, and pentaerythritol tetrabehenate.

* * * * *